(12) United States Patent
Gerhard et al.

(10) Patent No.: US 10,369,470 B2
(45) Date of Patent: Aug. 6, 2019

(54) USER INTERFACE CONTROL CLUSTER FOR ENHANCING A GAMING EXPERIENCE

(71) Applicant: PlayFusion Limited, Cambridge (GB)

(72) Inventors: Mark Michael Gerhard, Cambridge (GB); Riaan Henning Hodgson, Cambridge (GB); David Gomberg, Cambridge (GB)

(73) Assignee: PLAYFUSION LIMITED, Cambridge (GB)

( * ) Notice: Subject to any disclaimer, the term of this patent is extended or adjusted under 35 U.S.C. 154(b) by 271 days.

(21) Appl. No.: 15/581,476

(22) Filed: Apr. 28, 2017

(65) Prior Publication Data

US 2018/0311582 A1 Nov. 1, 2018

(51) Int. Cl.
| | |
|---|---|
| *A63F 13/00* | (2014.01) |
| *A63F 9/24* | (2006.01) |
| *A63F 13/53* | (2014.01) |
| *G06F 3/0481* | (2013.01) |
| *A63F 13/44* | (2014.01) |
| *G06F 3/0482* | (2013.01) |
| *G06F 3/0488* | (2013.01) |

(52) U.S. Cl.
CPC .............. *A63F 13/53* (2014.09); *A63F 13/44* (2014.09); *G06F 3/0482* (2013.01); *G06F 3/04817* (2013.01); *G06F 3/04886* (2013.01); *A63F 2300/308* (2013.01); *A63F 2300/69* (2013.01)

(58) Field of Classification Search
CPC .... A63F 13/214; A63F 13/2145; A63F 13/40; A63F 13/42; A63F 13/426; A63F 13/44; A63F 13/45; A63F 13/53; A63F 13/822; A63F 13/825; A63F 2300/1068; A63F 2300/1075; A63F 2300/308; A63F 2300/807; A63F 2300/8082; G06F 3/04817; G06F 3/04886
See application file for complete search history.

(56) References Cited

U.S. PATENT DOCUMENTS 8,578,294 B2 * 11/2013 Eom ...................... G06F 3/0482
715/769
8,719,729 B2 * 5/2014 Smith ................... G06F 3/0488
715/789

(Continued)

OTHER PUBLICATIONS

International Search Report and Written Opinion dated Jun. 11, 2018 from corresponding application No. PCT/US18/25676.

*Primary Examiner* — Milap Shah
(74) *Attorney, Agent, or Firm* — Hauptman Ham, LLP

(57) ABSTRACT

A method includes causing a control cluster to be included in a user interface and overlapping with an interactive virtual environment. The control cluster includes a first icon area, a second icon area, and a trigger icon area. The method further includes causing a first image to be displayed in the first icon area and a second image to be displayed in the second icon area. The method additionally includes causing a copy of the first image to be displayed in the trigger icon area or a copy of the second image to be displayed in the trigger icon area. The method also includes causing a readiness level of a game play feature to change, and causing the copy of the first image displayed in the trigger icon area or the copy of the second image displayed in the trigger icon area to be replaced with a trigger image.

19 Claims, 21 Drawing Sheets

(56) References Cited

U.S. PATENT DOCUMENTS

| | | | |
|---|---|---|---|
| 8,869,068 B2* | 10/2014 | Primiani | G06F 3/048 715/810 |
| 9,782,673 B2* | 10/2017 | Takagi | A63F 13/26 |
| 9,901,824 B2* | 2/2018 | Borodovsky | A63F 13/537 |
| 9,952,755 B2* | 4/2018 | Ogiso | G06F 3/04845 |
| 2004/0221243 A1* | 11/2004 | Twerdahl | G06F 3/016 715/834 |
| 2007/0149266 A1 | 6/2007 | Arakawa et al. | |
| 2007/0226648 A1* | 9/2007 | Hudson | A63F 13/10 715/810 |
| 2010/0041480 A1* | 2/2010 | Wong | A63F 13/06 463/37 |
| 2011/0171934 A1* | 7/2011 | Lim | H04L 51/043 455/412.1 |
| 2011/0265041 A1 | 10/2011 | Ganetakos et al. | |
| 2012/0169610 A1* | 7/2012 | Berkes | G06F 3/04883 345/173 |
| 2012/0242590 A1* | 9/2012 | Baccichet | G06F 3/0488 345/173 |
| 2013/0031515 A1* | 1/2013 | Funabashi | G06F 3/04886 715/863 |
| 2013/0084980 A1* | 4/2013 | Hammontree | A63F 13/06 463/36 |
| 2013/0288790 A1* | 10/2013 | Wang | A63F 13/06 463/31 |
| 2014/0011584 A1* | 1/2014 | Shin | G06F 3/048 463/31 |
| 2014/0047389 A1 | 2/2014 | Aarabi | |
| 2014/0066195 A1* | 3/2014 | Matsui | A63F 13/42 463/30 |
| 2014/0195940 A1* | 7/2014 | Ogiso | G06F 3/04845 715/765 |
| 2014/0213332 A1* | 7/2014 | Otsuka | A63F 13/06 463/2 |
| 2015/0182856 A1* | 7/2015 | Mays, III | A63F 13/2145 463/31 |
| 2015/0378593 A1* | 12/2015 | Zhang | G06F 3/0481 715/768 |
| 2016/0313912 A1* | 10/2016 | Keam | G06F 3/04886 |

* cited by examiner

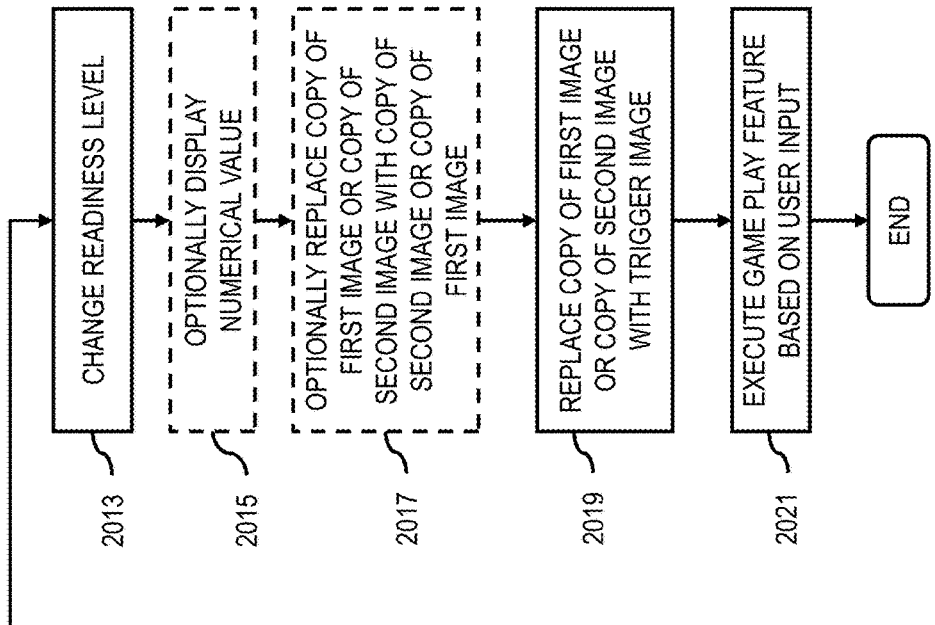
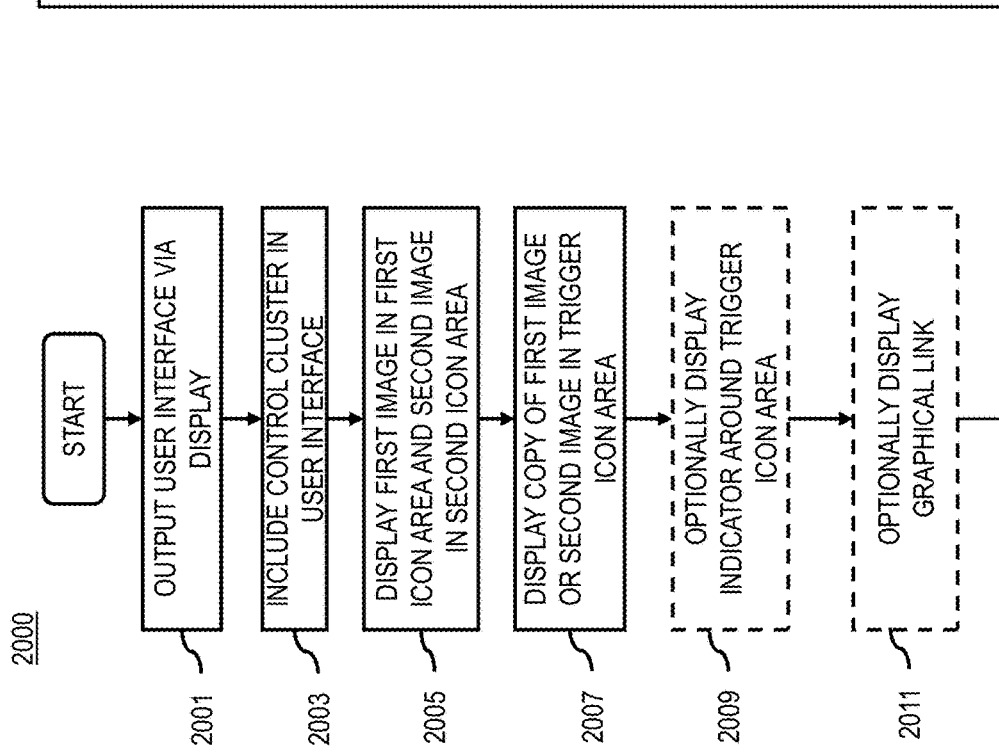
FIG. 20

USER INTERFACE CONTROL CLUSTER FOR ENHANCING A GAMING EXPERIENCE

BACKGROUND

Video game developers are continually challenged to develop new and interesting ways for users to interact with a virtual character or a virtual object in the context of a video game. Users typically control and/or develop characters in the context of a video game via interaction with a game controller such as a control pad or joystick.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 20 is a flowchart of a method, in accordance with some embodiments.

DETAILED DESCRIPTION

Figure 1:
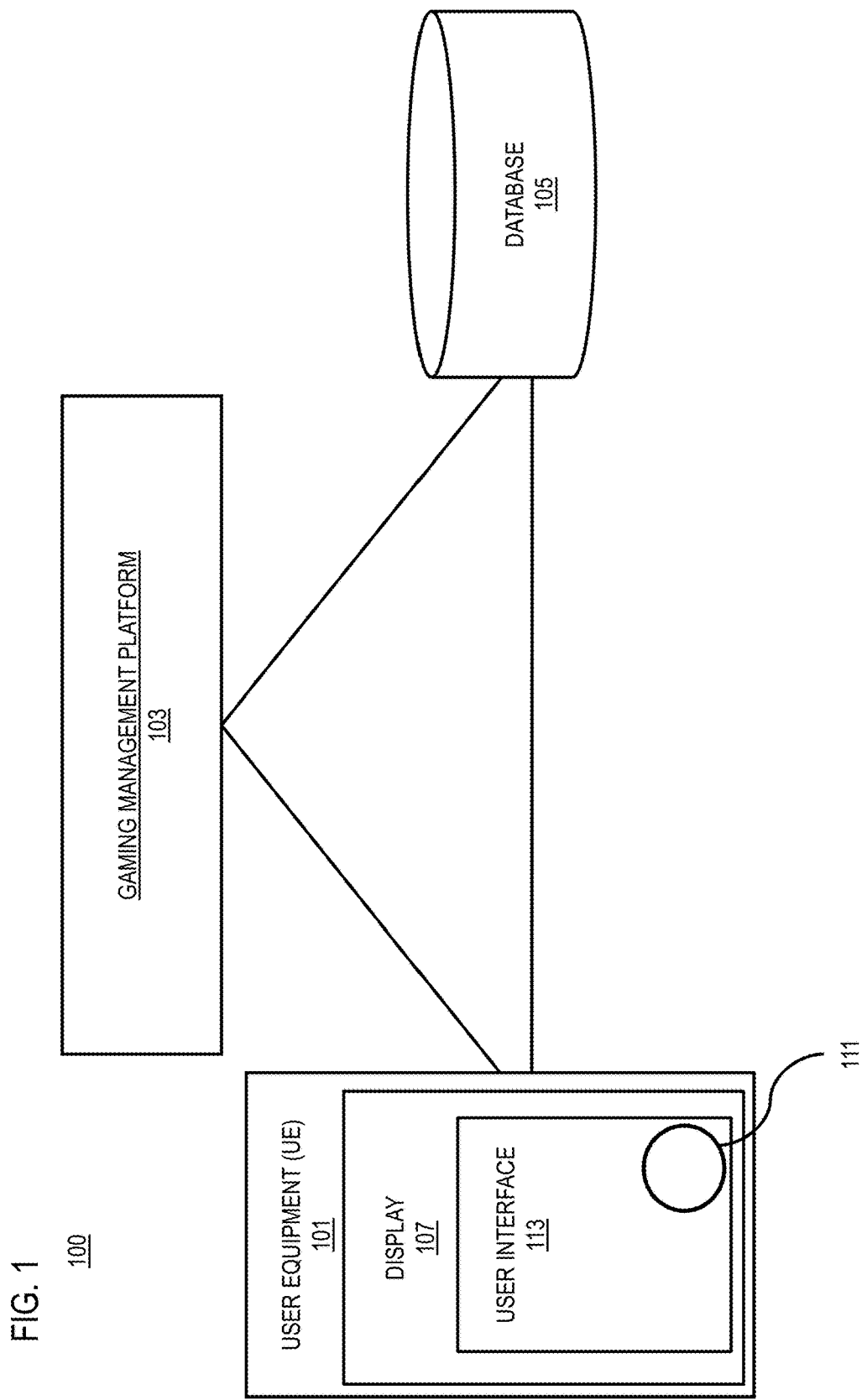
FIG. 1 is a diagram of a gaming system, in accordance with one or more embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation or position of a first feature over or on a second feature in the description that follows may include embodiments in which the first and second features are formed or positioned in direct contact, and may also include embodiments in which additional features may be formed or positioned between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of an apparatus or object in use or operation in addition to the orientation depicted in the figures. The apparatus may be otherwise oriented (rotated 90 degrees or at other orientations) and the spatially relative descriptors used herein may likewise be interpreted accordingly.

Video games are sources of interactive entertainment for consumers. Distinct from static traditional media sources like television and films, video games often involve the player influencing the outcome of the gaming experience in a dynamic narrative. Different users often have different experiences within a single video game, because different users sometimes dynamically influence the outcome in unique ways.

Users are often motivated to be "good" at a game, or develop a virtual character or gaming experience in a manner that is satisfying or rewarding. Playing a video game in certain ways usually results in a player progressing through the game more quickly, progressing through the game more efficiently, progressing further into the game, progressing to hidden portions of the game, or achieving some other type of rewarding game experience.

In the context of a video game, virtual characters or virtual objects sometimes have different abilities or capabilities. Users often play video games and use different abilities and receive rewards for successfully completing one or more actions within the interactive virtual environment associated with the video game. As a non-limiting example to aid in the understanding of this type of gaming scenario, reference is made to a combat scenario. In a combat scenario, a player may be able to choose between different elements, such as fire, water, ice and electricity for purposes of defeating an enemy during the simulated combat scenario. In this type of situation, the use of each of these elements may have an impact on the success of a player. For example, if a player encounters a fire demon in the context of the video game, using a water-based attack would be more successful than a fire-based attack.

In some video games, damaging or destroying enemies in the context of the video game results in points or awards. This may take the form of dropped items, such as gold, in-game weapons or virtual objects, or experience points for a virtual character to "pick up" or "acquire." In some video games, experience points increase a virtual character's strength, increase a virtual character's speed, improve a virtual character's ability with respect to a skill or action, make a virtual character more powerful, unlock previously unavailable skills or actions, or make it possible to proceed further in the game environment.

Video game developers are challenged to design games that drive a user forward in the game environment, or incentivize the user to be fully engaged with a video game product, and in doing so, embrace and engage with the myriad of elements and features that are embedded within the game. Doing so enhances the user's gaming experience, and increases the likelihood that the user will have an enjoyable gaming experience. Increased user enjoyment has a multitude of potential commercial benefits to the game developer.

Video game developers are challenged to balance the ease of use and the design of player instructions provided to a player during the course of a video game without interfering with a player's enjoyment of the video game, while creating an engaging game experience. On one hand, video game developers want to give users enough information to understand how to play the game. On the other hand, users derive great pleasure from autonomy, or feeling as though the user is free to play the game in the user's own way. Likewise, video game developers are challenged to ensure that all the carefully thought out features available in a video game are used by the player—otherwise the player may get bored, or not be as engaged with the video game product as much as the user could be.

Some video games include features that often force the user to play a certain way or to follow a particular path, constraining the user's interaction with the video game, and detracting from the feeling of success of progression that the user would otherwise feel if the user had the perception that the user achieved success in the context of the video game, or discovered game experiences, at the user's own doing. If a user is unable to engage with all the design elements the video game developer has placed in the game, for example, because of the user's limited skill level with respect to the video game, or because the video game has a hidden feature that the user has left undiscovered, then the user will likely become bored with the video game, play the video game for a short period of time, or not be engaged as much as the user could be with the video game product.

Simulated combat is often a feature of a video game. In the context of a video game, a virtual character controlled by a player may engage in a simulated combat experience with a computer controlled virtual character, or virtual characters controlled by other users. During the simulated combat, the user's character may be capable of engaging with an enemy using the virtual character's body, limbs, head, a virtual weapon, a virtual object, a magic power, or some other suitable ability usable in a combat scenario. The virtual character controlled by the user may win or lose depending on how effectively the user is engaged in combat. A player often gets the greatest satisfaction out of a combat experience if the player feels as though the player progressed through the combat scenario using the player's own combat ability, without being told exactly how this occurs. In some video games, progression in combat may also open up a broader gaming experience, allowing a player to take on more difficult enemies, and enjoy more that the overall game has to offer—helping the user to "feel" stronger or more powerful, or have a "sense" of progression.

In some video games, a combat function that is associated with a combat scenario such as that described above, includes a complex series of dynamic elements that are capable of being used together such as "combo," "buff" and "nerf." In the context of a video game, a combo is a game play feature in which several distinct game elements are amalgamated together to produce a greater overall impact on the game experience. For example, achieving a "combo" sometimes results in a more powerful outcome for the player, meaning the virtual character controlled by the player is capable of defeating more significant enemies, accumulating more points, progressing further into the game, or some other suitable reward for achieving the combo that would enhance the player's gaming experience. In the context of a video game, to buff is sometimes a manner by which a virtual character or virtual object controlled by a player becomes more powerful, has an increase in weapon impact or effectiveness, and increase in speed, strength, life, longevity of an effect of a game play feature, or some other suitable improvement or increase in a virtual character's or a virtual object's abilities. In the context of a video game, to nerf is sometimes a manner by which a virtual character or virtual object controlled by a player becomes less powerful, has an decrease in weapon impact or effectiveness, a decrease in speed, strength, life, longevity of an effect of a game play feature, or some other suitable hindrance or decrease in a virtual character's or a virtual object's abilities.

Some video games are configured to provide players with different forms of feedback. For example, video games often display a virtual character's movements or attack sequences, whether a virtual character receives damage, loses health, or some other event in the context of the game by way of a visual effect or a score associated with an event in the context of the game. Some of this feedback occurs within the gaming environment, by way of one or more of animations of a virtual character, an interactive virtual environment associated with the video game, or a non-player controlled virtual character.

During game play, rapid movements are often controlled using a joystick or a mouse, or by pressing a button on a game pad, joystick, mouse, keyboard, or other suitable physical controller. Such movements are sometimes more difficult when playing the video game using a touchscreen device. Video games that are developed specifically for play on a touchscreen device often lean toward a more passive method of play, with the game partially assisting the user in combat, movement, or progression through the game even more so than games developed for interaction by way of a physical controller to take account of the inherent limitations of a touchscreen device. This can lead to games, in particular the combat element thereof, being somewhat shallow compared to games with which a user interacts with the video game by way of a physical controller, wherein gameplay in various parts of the video game, such as a combat scenario, is relatively simple compared to gameplay in video games developed for interaction by way of a physical controller.

FIG. 1 is a diagram of a gaming system 100, in accordance with one or more embodiments. The gaming system 100 is configured to enhance a user's experience when playing a video game. As shown in FIG. 1, the gaming system 100 comprises a user equipment (UE) 101 having connectivity to a gaming management platform 103 and a database 105.

The UE 101, the gaming management platform 103 and the database 105 are modular components of a special purpose computer system. In some embodiments, one or more of the UE 101, the gaming management platform 103, or the database 105 are unitarily embodied in the UE 101. The UE 101, accordingly, comprises a processor by which the gaming management platform 103 is executed. In some embodiments, one or more of the UE 101, the gaming management platform 103, or the database 105 are configured to be located remotely from each other. By way of example, the UE 101, the gaming management platform 103 and the database 105 communicate by wired or wireless communication connection and/or one or more networks, or combination thereof.

The UE 101 is a type of mobile terminal, fixed terminal, or portable terminal including a desktop computer, laptop computer, notebook computer, netbook computer, tablet computer, wearable circuitry, mobile handset, server, gaming console, or combination thereof. The UE 101 comprises a display 107. In some embodiments, the UE 101 is communicatively coupled with display 107.

The gaming system 100 makes it possible for a user to interact with one or more of a virtual character or a virtual object represented in an interactive virtual environment by way of a user interface 109 and a control cluster 111 output by the UE 101. In some embodiments, the control cluster 111 makes it possible for a user to interact with a virtual character represented in the interactive virtual environment using the UE 101. In some embodiments, the control cluster 111 is configured to communicate the availability of a game play feature to a user based on a readiness level of the game play feature in the context of the video game. In some embodiments, the control cluster 111 is configured to help a player learn how to play a video game associated with the interactive virtual environment without the user feeling as though the user is being taught or forced through a series of events in the course of playing the video game. In some embodiments, the control cluster 111 is configured to help a player find or unlock a game play feature that a player having a limited skill-level or level of understanding of how to play the video game may otherwise miss or be unable to achieve without passive direction.

Gaming management platform 103 is a set of computer readable instructions that, when executed by one or more of a processor included in UE 101 or a processor such as a processor 2103 (FIG. 21), cause UE 101 to run a video game, host a video game, or interact with a web-based gaming host system or server. In some embodiments, the interactive virtual environment is in the context of a video game. In some embodiments, gaming management platform 103 facilitates the connectivity between the UE 101 and database 105. Database 105 is a memory such as a memory 2105 (FIG. 21) capable of being queried or caused to store data associated with the UE 101 or a user interaction with the user interface 109. In some embodiments, the gaming management platform 103 causes information that describes the UE 101, one or more user interactions with the UE 101, or other suitable information to be stored in the database 105. In some embodiments, the gaming management platform 103 is configured to cause an operating or game-related behavioral status or function of the UE 101 to be queried and optionally stored in the database 105.

The gaming management platform 103 is configured to cause the UE 101 to output the user interface 109 comprising the interactive virtual environment by way of the display 107. The gaming management platform 103 is also configured to cause the UE 101 to include the control cluster 111 in the user interface 109. The control cluster 111 is displayed in the user interface 109 such that the control cluster 111 is overlapping with the interactive virtual environment. In some embodiments, the control cluster 111 is completely covering a view of the interactive virtual environment. In some embodiments, the control cluster 111 is partially transparent such that the control cluster 111 and the interactive virtual environment behind the control cluster 111 are both viewable.

In some embodiments, the control cluster 111 is viewable and easy comprehend at all times, without intruding into the interactive virtual environment in a way that detracts from a user's gaming experience. In some embodiments, the control cluster 111 is caused to disappear from the user interface 109 and reappear based on a user interaction with the UE 101 that instructs the gaming management platform 103 to cause the control cluster 111 to be included in the user interface 109. In some embodiments, the control cluster 111 is caused to be included in the user interface 109 such that the control cluster 111 is positioned with respect to a particular side of the display 107. For example, if the display 107 has four sides, the control cluster 111 is caused to be positioned near a top side, a bottom side, a left side, or a right side of the display 107. In some embodiments, the display 107 has one or more of one side, three sides, four sides, five sides, six sides, or some other suitable quantity of sides.

In some embodiments, the control cluster 111 is caused to be included in the user interface 109 such that the control cluster 111 is positioned in a corner of the display 107. For example, an upper left-hand corner, a lower left-hand corner, an upper right-hand corner, or a lower right-hand corner of the display 107. In some embodiments, the control cluster 111 is caused to be displayed in a separate window compared to the interactive virtual environment. In some embodiments, the control cluster 111 is caused to be in displayed in a position that is changed based on an occurrence in the context of the video game, based on a period of time, based on a user selection, based on a user instruction to move the cluster 111 from one position to another position, or based on a timing with respect to the game, or a real-world event.

The control cluster 111 comprises one or more icon areas and at least one trigger icon area. In some embodiments, control cluster 111 comprises at least two icon areas. In some embodiments, the control cluster 111 comprises a plurality of icon areas. In some embodiments the control cluster 111 comprises two or more trigger icon areas. In some embodiments, the control cluster 111 comprises an array of icon areas positioned in an arced pattern around the at least one trigger icon area. In some embodiments, the icon areas have surface areas that are displayed via display 107 as being smaller than the surface area of one or more of the trigger icon areas displayed via display 107. In some embodiments, the gaming management platform 103 is configured to facilitate customization of the control cluster to suit a user's playstyle or preference. In some embodiments, the gaming management platform 103 is configured to enable a user to select a layout of control cluster 111 based on one or more preset templates for arranging the control cluster 111 that are stored in database 105.

The gaming management platform 103 is further configured to cause the UE 101 to cause a first image to be displayed in a first icon area of the array of icon areas and a second image to be displayed in a second icon area of the array of icon areas. The gaming management platform 103 is additionally configured to cause the UE 101 to cause a copy of the first image to be displayed in at least one trigger icon area or a copy of the second image to be displayed in at least one of the trigger icon area. In some embodiments, the gaming management platform 103 is configured to cause the UE 101 to cause an image other than the first image or the second image to be displayed in the trigger icon area. In some embodiments, images that are displayed in the trigger icon area of the control cluster 111 comprise one or more of a picture, a graphical symbol, a letter, a number, a color, pattern, or other suitable object capable of indicating an occurrence in the interactive virtual environment.

In some embodiments, images that are displayed in the icon areas of the control cluster 111 represent an occurrence in the interactive virtual environment such as a performance of a move, an execution of a power, use of a weapon or attack, collection of a virtual object, a movement to a location in the context of the video game, a passage of time within the context of the interactive virtual environment, a passage of real-world time, an execution of a combo, or some other suitable event in the context of the game that is capable of being instructed to a user to pursue or perform. In some embodiments, images that are displayed in the icon areas of the control cluster 111 comprise one or more of a picture, a graphical symbol, a letter, a number, a color, pattern, or other suitable object capable of indicating an occurrence in the interactive virtual environment.

In some embodiments, images displayed in the icon areas of the control cluster 111 are indicative of a limited quantity of abilities, movements, powers, weapons, attack-modes, or other suitable actionable event in the context of the interactive virtual environment (collectively referred to herein as "abilities, movements, powers, etc.") that a user has access to cause the virtual character to use or perform at a given time in the context of the interactive virtual environment. For example, if the control cluster 111 includes four icon areas, the user is optionally limited to choosing from the four abilities, movements, powers, etc. that have a corresponding image displayed in the icon areas of the control cluster 111. In some embodiments, if the control cluster 111 is customizable, the limited quantity of available movements, powers, etc., encourages a user to customize and change the available abilities, movements, powers, etc. based on one or more of the user's playstyle, character, progression in the context of the video game, or location in the interactive virtual environment.

In some embodiments, a quantity of abilities, movements, powers, etc. available to a user is based on how far into a video game the user has progressed. For example, if a user plays a video game of a predetermined period of time in the context of the game, or in real-world time, for a length of time in the game, and plays effectively, the virtual character controlled by the user accumulates experience points, and levels up, which, in turn, results in the gaming management platform 103 unlocking one or more abilities, movements, etc. available to a user for execution during the course of the game. In some embodiments, to make additional abilities, movements, etc. available, the gaming management platform 103 makes an ability that was previously unselectable capable of being selected by a user, the gaming management platform 103 causes an additional icon area having an image associated with a previously unavailable ability, movement, etc. to appear in the control cluster 111, the gaming management platform 103 causes an image associated with a previously unavailable ability, movement, etc. to appear in an icon area that was previously blank or empty, or the gaming management platform 103 causes an image associated with a previously unavailable ability, movement, etc. to appear in an icon area that was previously occupied by another image associated with a different ability, movement etc. such that the previous image is replaced.

As discussed, the gaming management platform 103 is configured to cause the UE 101 to display a copy of an image displayed in one of the icon areas in at least one trigger icon area. In some embodiments, when a combat scenario in the context of the interactive virtual environment is entered, an image corresponding to an ability, movement, element, etc. that the user should perform or collect to make a game play feature such as a "combo" available is displayed in the trigger icon area. In some embodiments, the image displayed in the trigger icon area is a copy of one of the images included in one of the icon areas of the control cluster 111. The inclusion of the copy of the image included in the trigger icon area is an instruction to a user to perform a movement, ability, element, etc. to make a game play feature available. In some embodiments, the gaming management platform 103 is configured to cause the UE 101 display a graphical link indicating a correspondence between the image displayed in one of the icon areas and the copy of the image displayed in the trigger icon area. In some embodiments, the gaming management platform 103 is configured to cause the UE 101 to cause a graphical link indicating a correspondence between the image displayed in one of the icon areas and the image other than the first image or the second image to be displayed in the trigger icon area. In some embodiments, graphical link comprises a line, series of lines, a highlight, a lightning bolt, or some other suitable graphic to connect, or at least indicate an association, between one of the movements, abilities, elements, etc. having images included in the icon areas and the copy of the image displayed in the trigger icon area. In some embodiments, the graphical link is indicative of a correspondence of a game play feature that is being charged (e.g. one that is associated with the first image) based on an action that occurs based on the other image included in the trigger icon area.

In some embodiments, the gaming management platform 103 is configured to cause a readiness level of a game play feature that is capable of being executed based on a user input to change. In some embodiments, the readiness level is a numerical value. In some embodiments, the readiness level is capable of being at least one of increased or decreased. In some embodiments, the readiness level of the game play feature is stored in the database 105. In some embodiments, the readiness level is stored in a memory associated with the UE 101. In some embodiments, the readiness level is managed off-screen by the gaming management platform 103.

In some embodiments, the gaming management platform 103 is configured to cause the UE 101 to display an indicator configured to indicate the readiness level of the game play feature. In some embodiments, the indicator comprises one or more of a symbol, a graphic, a logo, a sign, a signal, a meter, an image, an icon, a letter, a number, a word, a color, or some other suitable guide configured to indicate, show, illustrate or demonstrate the readiness level of the game play feature. In some embodiments, the indicator is a meter that is caused to be displayed surrounding the trigger icon area. In some embodiments, the indicator is a graphic capable of indicating a movement across a color spectrum indicative of a change in the readiness level. In some embodiments, the indicator is an animated movement of the control cluster 111. For example, to show that the game play feature is ready for execution, the indicator is one that shoes the control cluster moving by one or more of spinning, pulsing, vibrating, or some other suitable motion to catch a user's attention.

The gaming management platform 103 is further configured to cause the UE 101 to cause the readiness level to change based on one or more of a first type of occurrence in the interactive virtual environment associated with a first image included in one of the icon areas or a second type of occurrence in the interactive virtual environment associated with a second image included in another one of the icon areas. In some embodiments, gaming management platform 103 is configured to cause the UE 101 to cause the readiness level to change by a first amount based on the first type of occurrence in the interactive virtual environment or by a second amount based on the second type of occurrence in the interactive virtual environment different from the first amount.

In some embodiments, the readiness level indicated by the indicator builds by displaying a solid line that represents a percentage or amount that the indicator is full, around the outside of the trigger icon area included in the control cluster 111. In some embodiments, the game play feature is available if the indicator is completely full. In some embodiments, the game play feature is available, but to a lesser degree, e.g. less powerful, less effective, or for a reduced amount of time the game play feature is available, if executed, than if the indicator is completely full. In some embodiments, a symbol, a graphic, a logo, a sign, a signal, an image, an icon, a letter, a number, a word, a color, or some other suitable guide representative of a charge amount of the game play feature is displayed in addition to, or as an alternative of, the solid line of the indicator.

Based on a determination that the readiness level is full or at least greater than or equal to a predetermined threshold level, the gaming management platform 103 is configured to cause the UE 101 to replace the copy of the image displayed in the trigger icon area to be replaced with a trigger image indicating the game play feature is ready to be executed. In some embodiments, when a game play feature is ready to be executed, the trigger image displayed in the trigger icon area is an image associated with the game play feature. In some embodiments, the trigger image is a textual instruction. In some embodiments, the textual instruction is a word such as "Attack," "Combo," "Magic," "Fire," "Torch," "Invincibility," or some other suitable verbal instruction indicating that a game play feature is ready to be executed." In some embodiments, based on the readiness level demonstrated by the indicator reaching a predetermined amount, for example when the meter is full or filled to an amount that is less than full, but greater than a preset threshold value, or a color transition indicative of a change in readiness level to full or filled to amount that is greater than a predetermined threshold level, the gaming management platform 103 is configured to cause the UE 101 to replace the copy of the image displayed in the trigger icon area to be replaced with a trigger image indicating the game play feature is ready to be executed.

The gaming management platform 103 is configured to cause the game play feature to be executed based on a user interaction with the trigger image displayed in the trigger icon area. In some embodiments, the user interaction with the trigger image is by way of a touchscreen of the UE 101. In some embodiments, the user interaction with the trigger image is by way of a game controller communicatively coupled with the UE 101.

In some embodiments, the game play feature is a special attack mode, an increase shield strength, improved healing powers, increased speed, increased wizardry powers, increased weapon strength, access to a hidden passageway, or some other suitable reward for progressing through the video game.

In some embodiments, if the game play feature is executed, the gaming management platform 103 is configured to reset the readiness level and initiate a process for making the game play feature available again. In some embodiments, the process of making a game play feature available is a charge mode. In some embodiments, if a game play feature is executed, and the game play feature is no longer available to be executed again, the gaming management platform 103 is configured to initiate a process for making a different game play feature ready for execution by way of a similar process of making the game play feature ready for execution. In some embodiments, if an available game play feature is executed based on a user input, the gaming management platform 103 is configured to pick a random game play feature that could be made available, select a game play feature that could be made available based on a progression in the context of the interactive virtual environment, or cause a game play feature selected based on a user input to be the basis for repeating the process of making a game play feature available. In some embodiments, a new combo is selected, either randomly or by the election of the player and the charging process or charge mode begins again. In some embodiments, the gaming management platform 103 is configured to prevent a single game play feature from being available in a single combat scenario or within a predetermined period time after the game play feature has been executed.

In some embodiments, how quickly the readiness level increases is based on a multiplier associated with an occurrence in the context of the game, a passage of time, and event, or some other suitable element. In some embodiments, the gaming management platform 103 is configured to cause the UE 101 to cause the readiness level to change based on one or more of a passage of time within the interactive virtual environment, a real-world passage of time, or a real-world event. In some embodiments, a real-world event is based on a scanning of a playing card affiliated with a video game by the UE 101, or some other device in communication with the gaming management platform 103, a determination by the gaming management platform 103 that the user has watched or is watching a television show, a determination that the user has been or is in a particular location or a combination of locations, a determination that the user has been or is within a range of particular location or a combination of locations, a determination that the user has been or is in a proximity of one or more other users having an account associated with the video game, or some other suitable real-world occurrence that could be used as a basis for instigating a reward to enhance a user's engagement level with the interactive virtual environment. In some embodiments, the gaming management platform 103 is configured to cause the readiness level to change based on a real-world monetary purchase of the game play feature.

In some embodiments, the gaming management platform 103 is configured to cause the UE 101 to detect a quantity of user interactions with the interactive virtual environment during a passage of time within the interactive virtual environment, and to calculate an amount of time a user is interacting with the interactive virtual environment based on the quantity of user interactions during the passage of time within the interactive virtual environment. In some embodiments, the gaming management platform 103 is configured to cause the UE 101 to cause the readiness level to change based on a percentage of time the user is interacting with the interactive virtual environment during the passage of time within the interactive virtual environment. In some embodiments, the gaming management platform 103 is configured to cause the UE 101 to increase the readiness level if the percentage of time the user is interacting with the interactive virtual environment is above a predetermined threshold level. In some embodiments, the gaming management platform 103 is configured to cause the UE 101 to decrease the readiness level if the percentage of time the user is interacting with the interactive virtual environment is below a predetermined threshold level.

In some embodiments, the gaming management platform 103 is configured to cause the UE 101 to display the multiplier as a numerical value in the user interface 109 if a copy of an image associated with a movement, ability, element, etc. included in the icon areas is displayed in the trigger icon area. In some embodiments, the gaming management platform 103 is configured to cause the UE 101 to cause the numerical value to be concurrently displayed with copy of the image included in the trigger icon area.

The numerical value indicates the amount the readiness level is caused to change if the instructed movement, ability, element, etc. is performed. In some embodiments, if the image displayed in the trigger icon area is associated with an electrical attacks, but the player instead uses a physical attack, then the gaming management platform 103 will not increase the readiness level. In some embodiments, the gaming management platform 103 is configured to cause the readiness level to increase by an amount based on the multiplier, if the instruction is followed, but to also increase the readiness level by an amount that is less than that indicated by the multiplier, if a movement, action, element, etc. other than that which is instructed is performed. In some embodiments, the gaming management platform 103 is configured to cause the readiness level to increase at a rate that is based on how active or engaged a player is with the video game. In some embodiments, the gaming management platform 103 is configured to cause the readiness level to progressively increase at progressively increasing rates based on how active or engaged a player is with the video game.

In some embodiments, the gaming system 100 allows players to continue to play a video game in a passive playstyle, but actively provides players with rewards and incentives, as well as a means, to play more actively. The gaming system 100 allows players to execute game play features that make a virtual character more powerful, or buff the virtual character for a period of time, enhancing virtual character's combat performance. The system 100 makes it possible for players to benefit from the game play features, but keeps the user engaged with the video game by basing execution of the game play features on a user input. The system 100, therefore, makes it possible for a user to play the game while paying attention to the control cluster 111, playing in a way that is attenuated to the readiness level, and then activating the game play feature when the game play feature is ready to be executed.

In some embodiments, the gaming management platform 103 is configured to dynamically activate elements indicated by images included in the icon areas of the control cluster 111 during course of play, and continuing to do so. In some embodiments, the gaming management platform 103 is configured to change the multiplier based on how quickly elements are activated in the control cluster 111. In some embodiments, the gaming management platform 103 is configured to continue to increase the multiplier only if the virtual character is engaged in a combat scenario in the context of the video game. In some embodiments, the gaming management platform 103 is configured to cause the multiplier displayed by the UE 101 during the combat scenario to diminish or disappear when the virtual character is no longer engaged in the combat scenario or leaves the combat scenario. The presence of the multiplier during the combat scenario and the lack of a multiplier outside the combat scenario encourages a user to continue in combat, even if, for example, the virtual character has a limited level of health in the game, because the user may be able to increase the readiness level to an amount that makes the game play feature available, which could turn the tide of the combat scenario in the user's favor, thereby driving the player forward into the game, and encouraging the user to take risks in return for higher rewards. In some embodiments, this risk/reward mechanic actively encourages a more aggressive playstyle and a more active playstyle compared to that which a user would traditionally associate with a touchscreen-based video game, or one that is too difficult for an unskilled user to enjoy. In some embodiments, the gaming management platform 103 makes it possible for a user to play the video game without giving the user interface 109 a lot of focus. But, if the user chooses to focus on the user interface 109, the user is able to be more actively engaged in the game, to improve the user's ability with respect to the game, and the progress quicker and more effectively than if the user did not use the game play features made available by way of the control cluster 111.

In some embodiments, the gaming management platform 103 is configured to passively direct a user to play the video game in a particular way, encourage a user to change the user's playstyle, or adapt to new scenarios in the context of the game. In some embodiments, the gaming management platform 103 is configured to cause a lesser used "power" to become more prominent in the displayed control cluster 111, compelling the user to change the user's playstyle to receive a maximum increase in readiness level. Players often stick with familiar playstyles. For example, players sometimes use a favorite slashing weapon, fire attack, jump, or kick, although other possible actions, movements, or weapons are available in the context of the game. A player may then progress through a game utilizing a limited amount of the potential attacks and benefits available to the user by sticking to tried and tested methodologies. The gaming management platform 103, by highlighting one or more images included in the icon areas of the control cluster 111, helps a player derive benefits from, or is pushed toward, varying their playstyle, which will help the user engage with more of the available content included in the video game. In some embodiments, gaming management platform 103 is configured to randomize or change what helps the user increase the readiness level, encouraging players to play differently and consume content differently.

In some embodiments, the gaming management platform 103 is configured to cause a puzzle, an alternative path, an alternative world, a secret game level, a level warp, or a game dimension to be accessible by the user in the context of the interactive virtual environment based on the execution of the game play feature. In some embodiments, the gaming management platform 103 is configured to cause the control cluster 111 to include a teaser or an incentive, showing a user a preview of what the user could earn if the user keeps playing the video game.

In some embodiments, the icon areas of the control cluster 111 are passive areas that are instructional to a user, and incapable of being interacted with in a manner that has an effect in the context of the interactive virtual environment, and the trigger icon area of the control cluster 111 is configured to be an active area that is capable of being interacted with by the user in a manner that has an effect in the interactive virtual environment. In some embodiments, control cluster 111 comprises one or more passive areas that are proximate the icon areas or the trigger icon area, and configured to convey information to a user.

Figure 2:
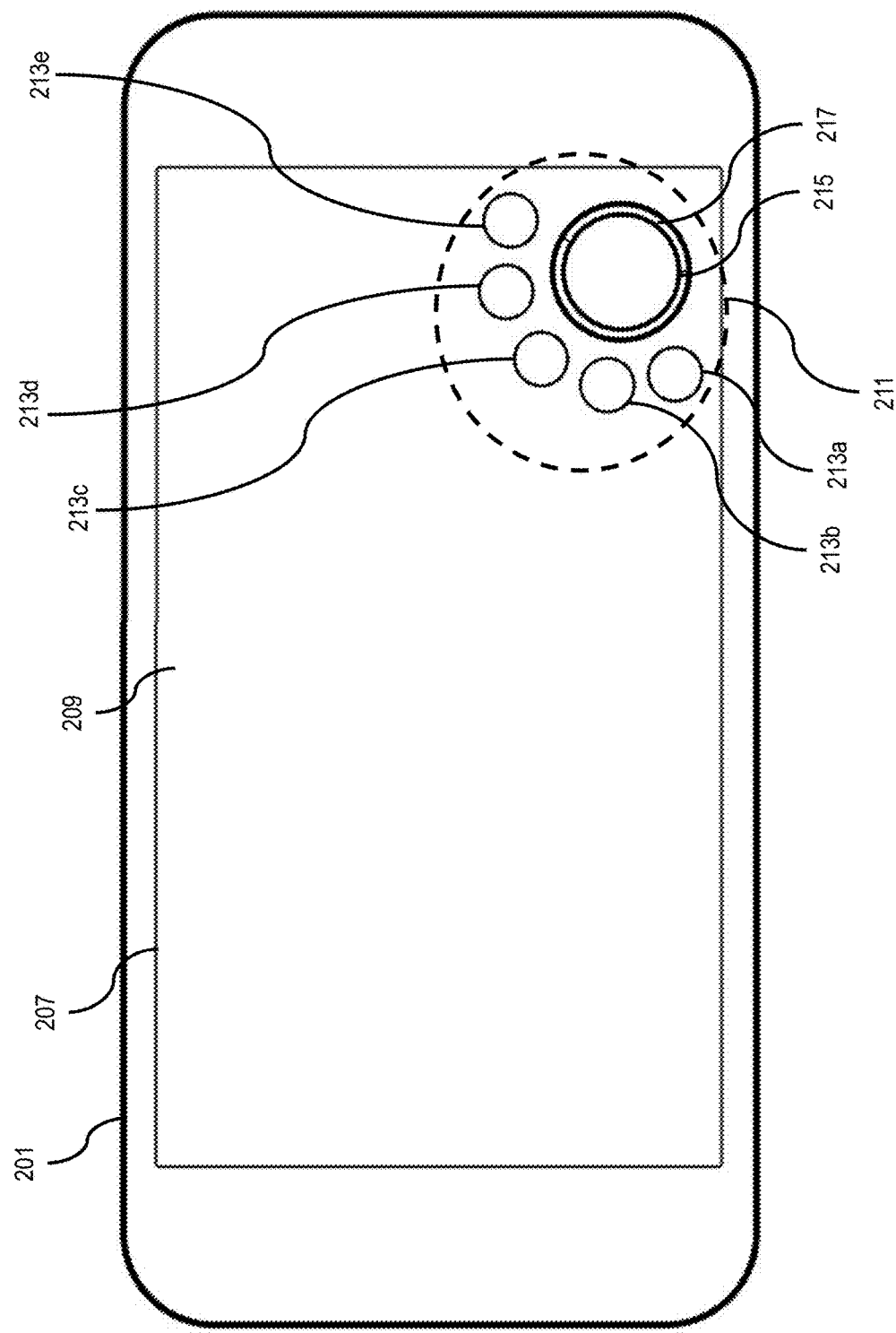
FIG. 2 is a diagram of a user equipment, a display, a user interface, and a control cluster, in accordance with one or more embodiments

FIG. 2 is a diagram of a UE 201, a display 207, a user interface 209, and a control cluster 211, in accordance with one or more embodiments. UE 201, display 209, user interface 209, and control cluster 211 are similar to features described with respect to FIG. 1, with the reference numerals increased by 100.

UE 201 is running a video game that is viewable by way of the display 207. A user interacts with the video game by way of one or more of the user interface 209 or the control cluster 211. The control cluster 211 comprises a plurality of icon areas 213a-213e, a trigger icon area 215, and an indicator 217.

UE 201 is a mobile device having a touchscreen such that a user input is capable of being received by way of contacting display 207 with a user's finger, a stylus, or some other suitable device for interacting with a touch-sensitive display. The control cluster 211 is positioned in a lower right-hand corner of the display 207 to avoid obscuring the interactive virtual environment in user interface 209. The position of the control cluster 211 in the lower right-hand corner of the display 207 also helps to facilitate a user's ability to interact with the control cluster 211, because the control cluster 211 is capable of being touched, for example, by a user's thumb if the user is holding the UE 201 in the user's right hand. In some embodiments, the control cluster is in a different position, such as a lower-left hand corner of the display 207 to facilitate a user's ability to interact with the control cluster 211 using the user's left thumb. In some embodiments, the control cluster 211 is capable of being positioned based on a user preference.

Figure 3:
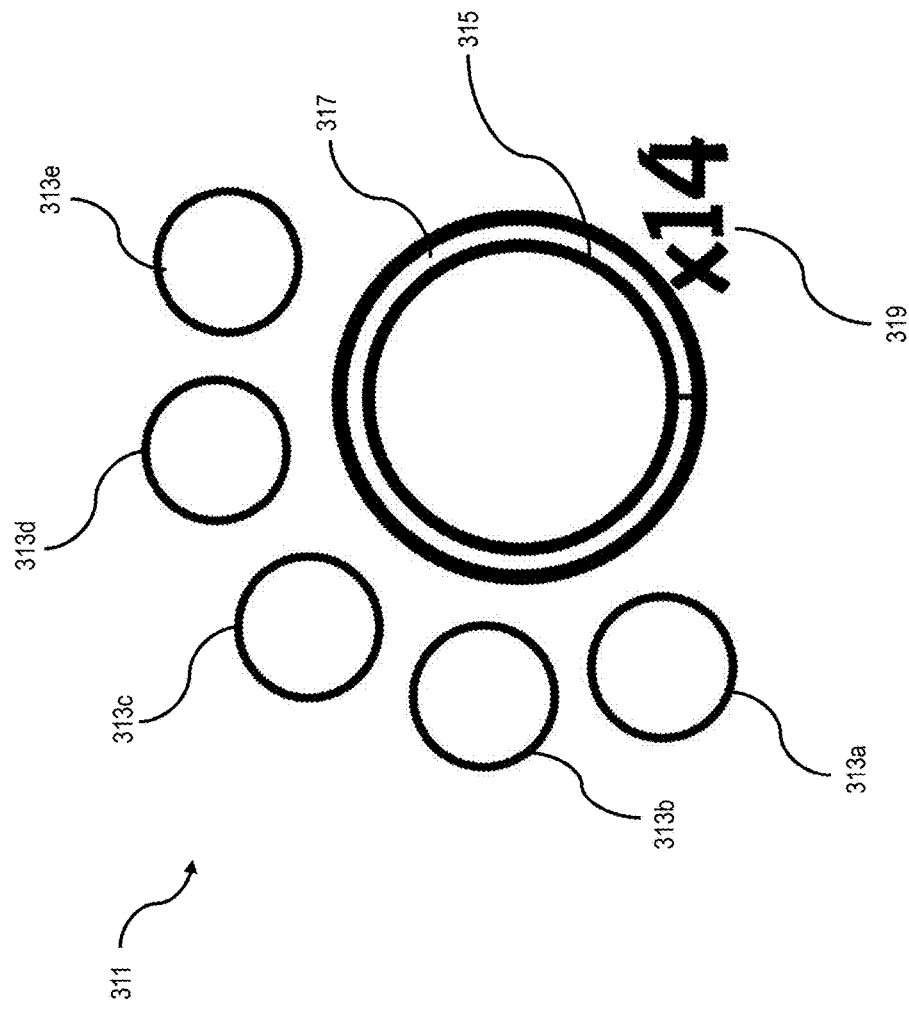
FIG. 3 is a diagram of a control cluster, in accordance with one or more embodiments

FIG. 3 is a diagram of a control cluster 311, in accordance with one or more embodiments. Control cluster 311 comprises features similar to those described with respect to control cluster 211 shown in FIG. 2, with the reference numerals increased by 100. Control cluster 311 has empty icon areas 313a-313e, and an empty trigger icon area 315. The indicator 317 is empty as well. Control cluster 311 includes multiplier 319, which would be applicable for increasing the readiness level indicated by the indicator 317 if the trigger icon area 315 included a copy of an image of a movement, ability, power, weapon, etc. that is included in one of the icon areas 313 during a charge mode of the game play feature.

Figure 4:
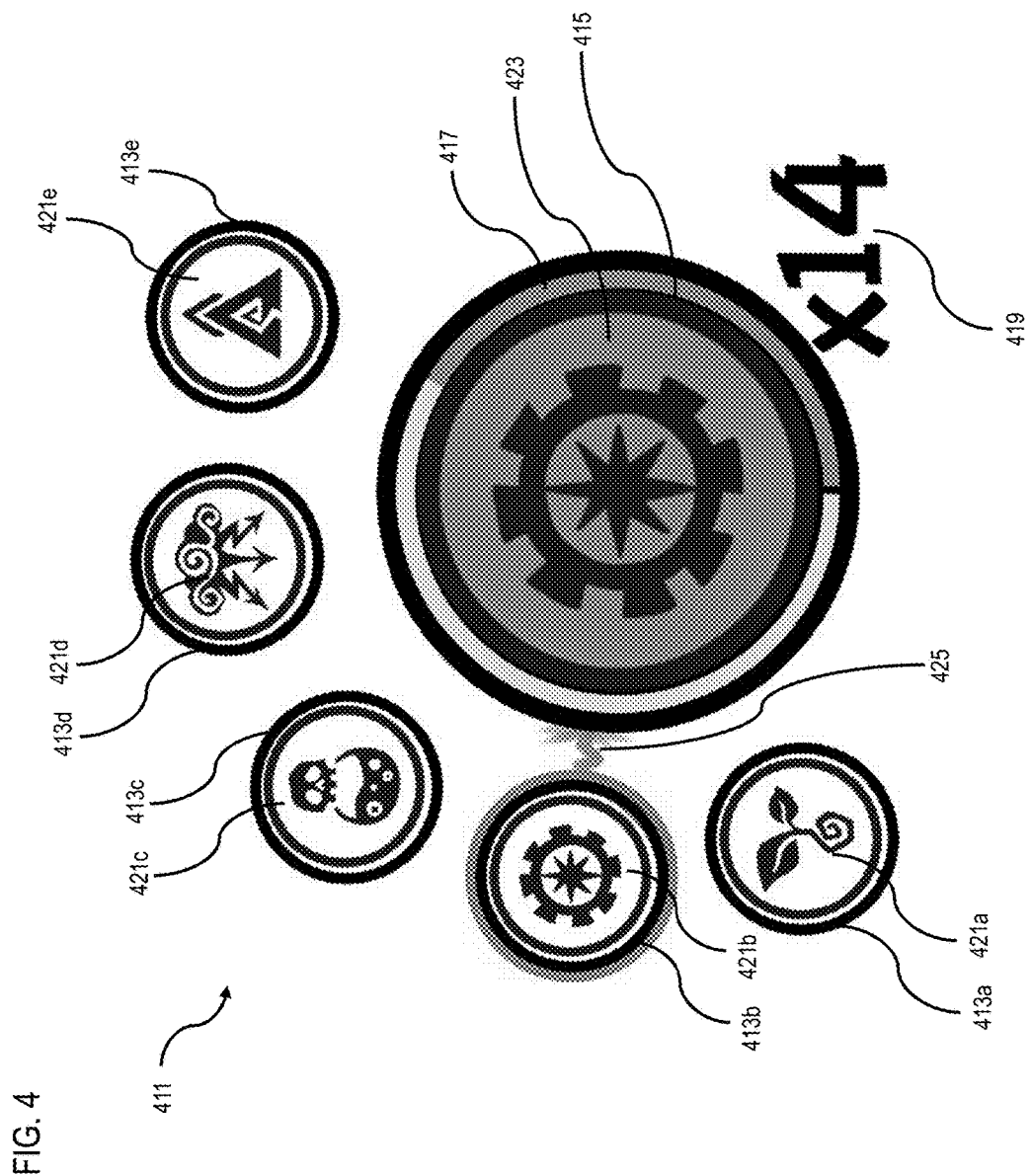
FIG. 4 is a diagram of a control cluster during a charge mode of a game play feature, in accordance with one or more embodiments

FIG. 4 is a diagram of a control cluster 411 during a charge mode of a game play feature, in accordance with one or more embodiments. Control cluster 411 comprises features similar to those described with respect to control cluster 311 shown in FIG. 3, with the reference numerals increased by 100. In control cluster 411, the icon areas 413a-413e have images 421a-423e that represent abilities, movements or weapons, etc. available to the user in the context of the interactive virtual environment. The trigger icon area 415 includes a copy 423 of image 421b. Control cluster 411 also includes a graphical link 425 indicating a connection between the copy 423 of image 421b included in the trigger icon area 415. Additionally, the indicator 417 is at least part way full.

In this example embodiment, a tech (cogwheel) combo is being powered up during a charge mode of the game play feature. If a user performs an action associated with the tech combo represented by image 421b, which is highlighted and connected by way of the graphical link 425, the user can cause the indicator 417 to increase the readiness level more quickly than if the user performed an action associated with a different combo or ability represented by one of the images 421a or 421c-421e. For example, if a player uses a nature power associated with image 421a, the readiness level indicated by the indicator 417, in some embodiments, would be caused to increase by an amount that is less than an amount that an action associated with the tech combo represented by image 421b would cause the readiness level to increase.

In some embodiments, if the user performs an action associated with one of the different combos or abilities represented by one of the images 421a or 421c-421e, then the action would not have an effect on the level of readiness indicated by the indicator 417.

In some embodiments, the multiplier 419 is caused to increase if a user performs an action associated with the tech combo represented by image 421b, which is highlighted and connected by way of the graphical link 425. An increased multiplier 419, in turn, increases the rate at which the readiness level indicated by the indicator 417 fills, making it possible for the game play feature to become available for execution. But, the lack of a link to the different combos or abilities represented by one of the images 421a or 421c-421e indicates that if a user performs one of the different combos or abilities represented by one of the images 421a or 421c-421e, the multiplier 419 would not be caused to increase.

In some embodiments, the gaming management platform 103 is configured to cause the indicator 417 to change the readiness level a first amount based on a first type of occurrence in the interactive virtual environment if a copy of one of images 421a-421e is displayed in the trigger icon area 415, and cause the indicator 417 to change the readiness level by a second amount based on a second type of occurrence in the interactive virtual environment if a copy of one of the other images 421a-421e is displayed in the trigger icon area 415.

In some embodiments, the gaming management platform 103 is configured to cause the indicator 417 to change by a third amount different from the first amount based on the first type of occurrence in the interactive virtual environment if the copy of the other of images 421a-421e is displayed in the trigger icon area 415 at a time the first type of occurrence in the interactive virtual environment occur, and cause the indicator 417 to change by a fourth amount different from the second amount based on the second type of occurrence in the interactive virtual environment if the copy of the first of images 421a-421e is displayed in the trigger icon area 415 at a time the second type of occurrence in the interactive virtual environment occurs.

In some embodiments, the gaming management platform 103 is configured to cause the UE 101 to change the copy of the first image displayed in the trigger icon area 415 to be replaced with a copy of the second image during a charge mode of the game play feature for increasing the readiness of the game play feature based on a first predetermined period of time, and cause the copy of the second image displayed in the trigger icon area 415 to be replaced with the copy of the first image during the charge mode of the game play feature for increasing the readiness of the game play feature based on a second predetermined period of time.

In some embodiments, the gaming management platform 103 is configured to cause the copy of a first image included in the trigger icon area 415 to change to a copy of a different one of images 421a-421e based on a time or event in the context of the interactive virtual environment. In some embodiments, the gaming management platform 103 is configured to cause the copy of the image included in the trigger icon area 415 to change to a copy of a different one of images 421a-421e at a predetermined time interval. In some embodiments, the gaming management platform 103 is configured to cause the copy of the image included in the trigger icon area 415 to change to a copy of a different one of images 421a-421e at a 10-second time interval. In some embodiments, the gaming management platform 103 is configured to cause the copy of the image included in the trigger icon area 415 to change to a copy of a different one of images 421a-421e randomly.

In some embodiments, the gaming management platform 103 is configured to cause the UE 101 to cause the indicator 417 to indicate an increase in the readiness level based on one or more of the first type of occurrence or the second type of occurrence occurs, and to decrease the readiness level based on an event in the virtual environment.

Figure 5:
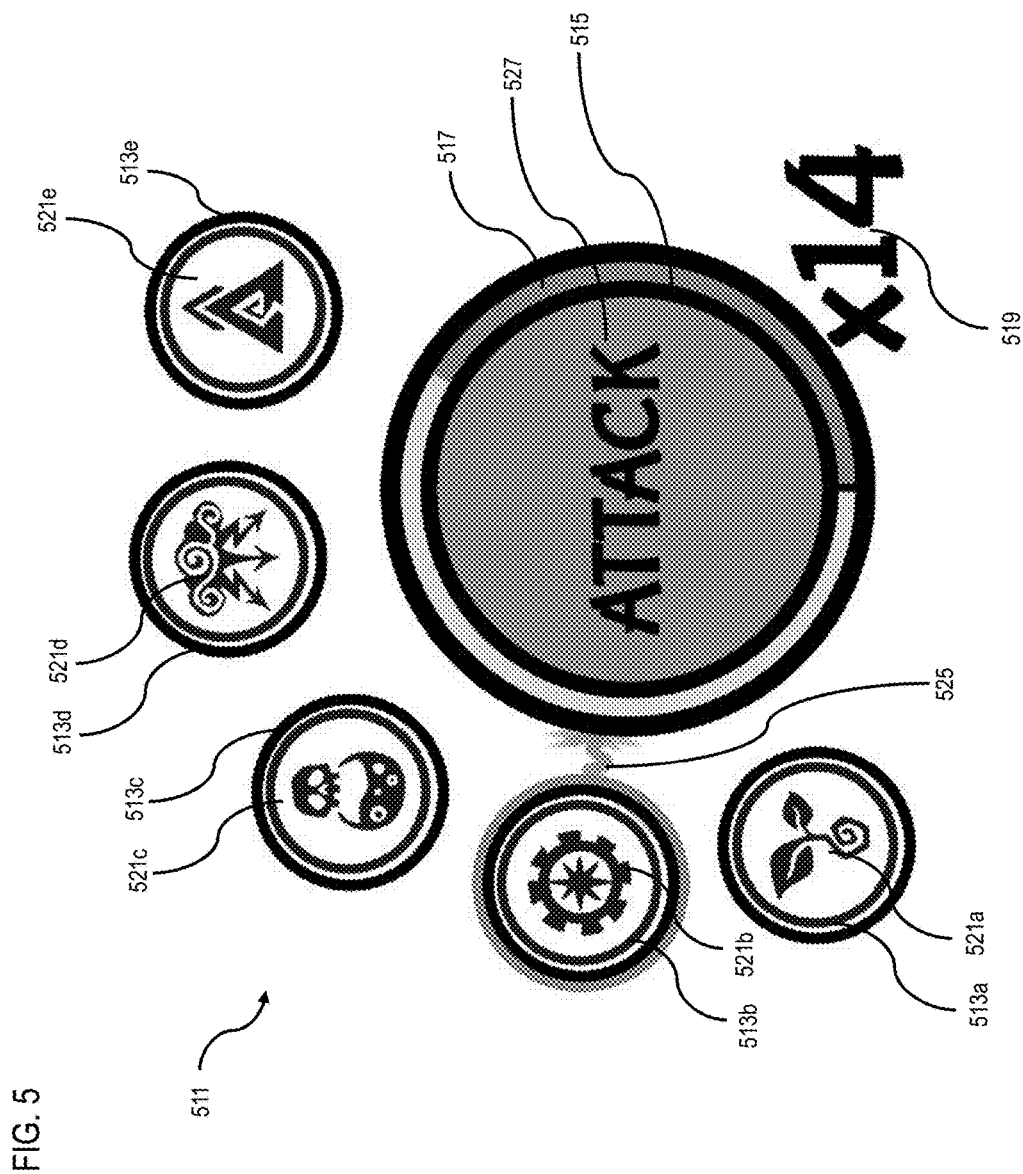
FIG. 5 is a diagram of a control cluster during a charge mode of a game play feature, in accordance with one or more embodiments

FIG. 5 is a diagram of a control cluster 511 during a charge mode of a game play feature, in accordance with one or more embodiments. Control cluster 511 comprises features similar to those described with respect to control cluster 411 shown in FIG. 4, with the reference numerals increased by 100. In control cluster 511, the icon areas 513a-413e have images 521a-513e that represent abilities, movements or weapons, etc. available to the user in the context of the interactive virtual environment. The trigger icon area 515 includes a trigger image 527. Control cluster 511 also includes a graphical link 525 indicating a connection between the game play feature available for execution indicated by the trigger image 527 included in the trigger icon area 515 and image 521b. Additionally, the indicator 517 is at least part way full.

In FIG. 5, the gaming management platform 103 (FIG. 1) replaced the image 421b (FIG. 4) with the trigger image 527 based on the readiness level indicated by indicator 517. The inclusion of the trigger image 527 in trigger icon area 515 indicates that the game play feature is available for execution based on a user input. In some embodiments, the user input is based on a selection or a toggling of the trigger image 527. In some embodiments, the control cluster 511 is configured to indicate more than one game play feature is available for execution. In some embodiments, the control cluster 511 comprises multiple trigger icon areas 515, a series of layered trigger images 527 in the trigger icon area 515, a series of layers trigger images 527 in overlapping trigger icon areas 515 that are slightly offset from one another to indicate that multiple game play features are available for execution, or a menu that is capable of being accessed based on a user input that includes an interface within which one or more game play features available for execution are indicated.

Figure 6:
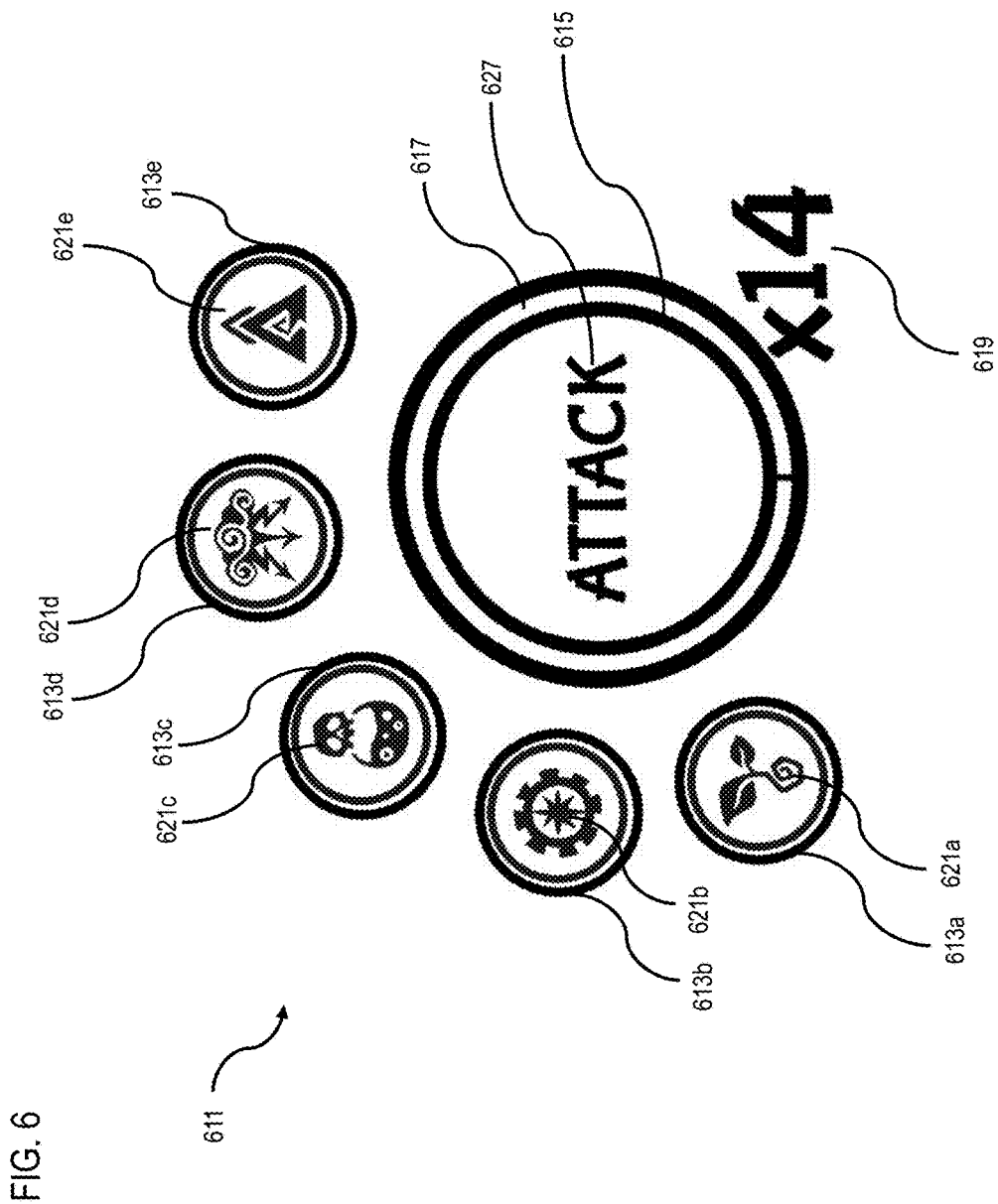
FIG. 6 is a diagram of a control cluster after a charge mode of a game play feature, in accordance with one or more embodiments

FIG. 6 is a diagram of a control cluster 611 after a charge mode of a game play feature, in accordance with one or more embodiments. Control cluster 611 comprises features similar to those described with respect to control cluster 511 shown in FIG. 5, with the reference numerals increased by 100. In control cluster 611, the icon areas 613a-613e have images 621a-613e that represent abilities, movements or weapons available to the user in the context of the interactive virtual environment. The trigger icon area 615 includes a trigger image 627, indicating the game play feature is available for execution. The indicator 617 is empty, as no game play feature is being charged.

Figure 7:
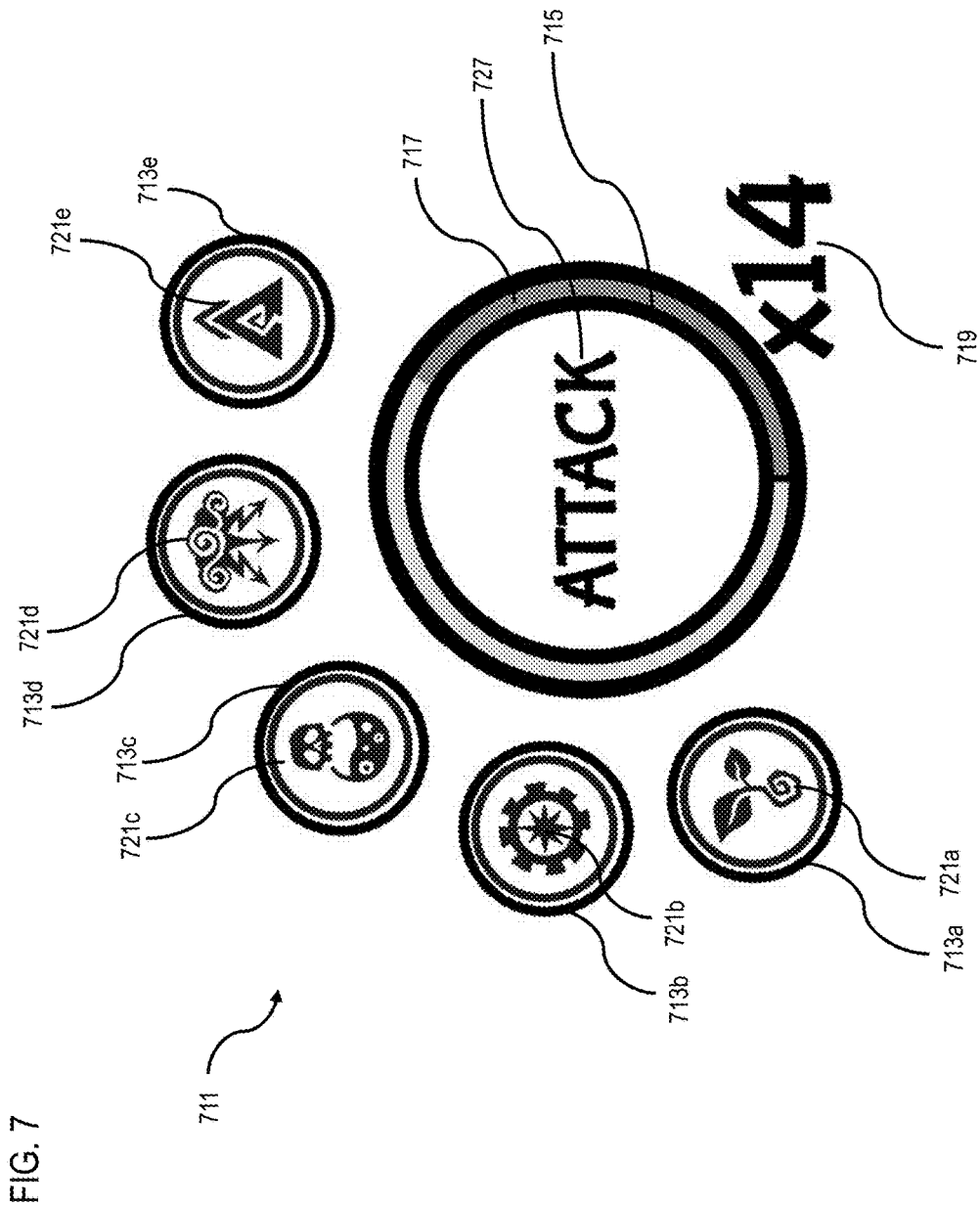
FIG. 7 is a diagram of a control cluster after a charge mode of a game play feature, in accordance with one or more embodiments.

FIG. 7 is a diagram of a control cluster 711 after a charge mode of a game play feature, in accordance with one or more embodiments. Control cluster 711 comprises features similar to those described with respect to control cluster 611 shown in FIG. 6, with the reference numerals increased by 100. In control cluster 711, the icon areas 713a-713e have images 721a-713e that represent abilities, movements or weapons available to the user in the context of the interactive virtual environment. The trigger icon area 715 includes a trigger image 727, indicating the game play feature is available for execution. The indicator 717 is at least partially full, indicating that the game play feature available for execution capable of being used in the context of the interactive virtual environment, but at a level that is less than full, because the game play feature is not in a charge mode.

Figure 8:
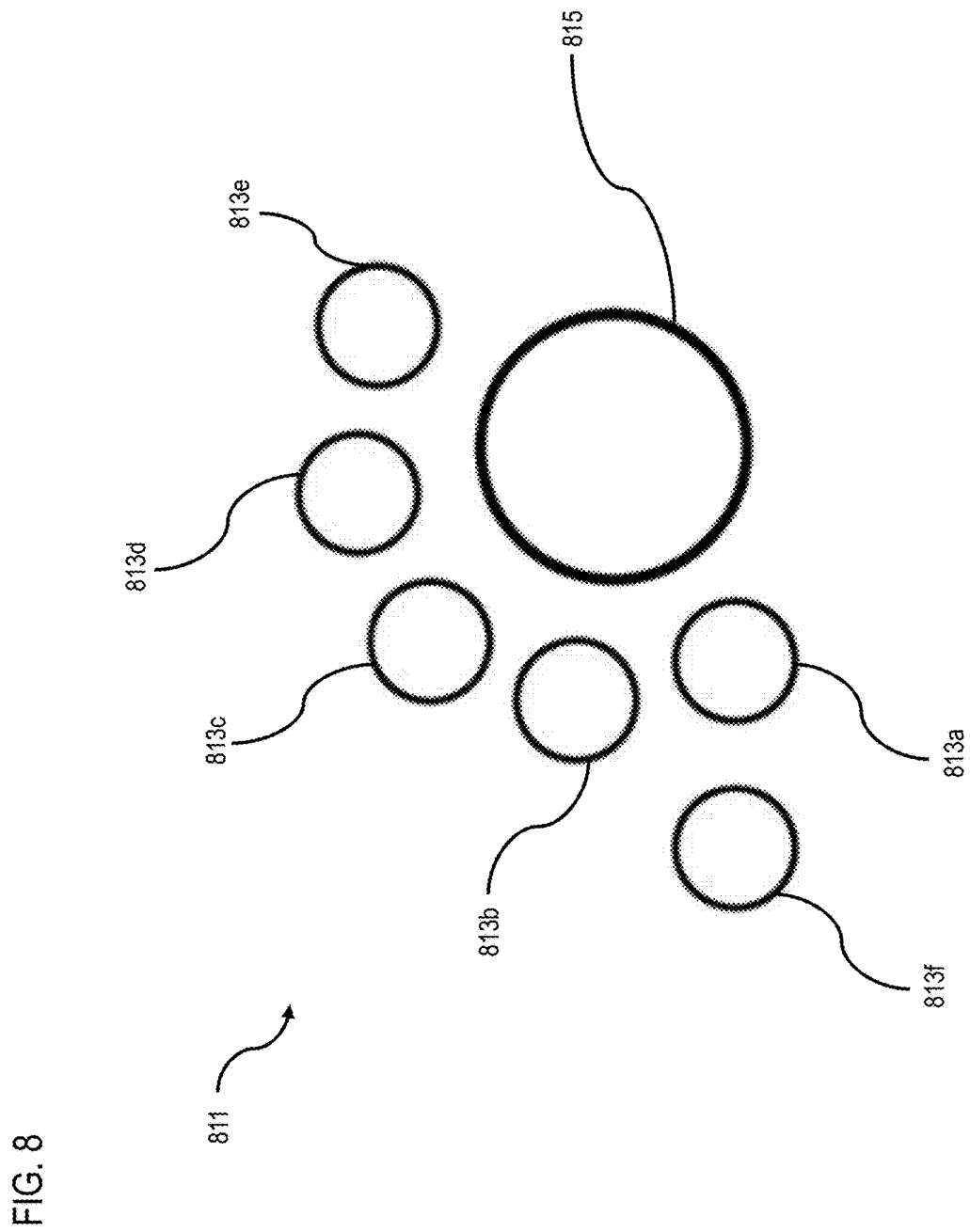
FIG. 8 is a diagram of a control cluster, in accordance with one or more embodiments.

FIG. 8 is a diagram of a control cluster 811, in accordance with one or more embodiments. Control cluster 811 is similar to control cluster 111 discussed with respect to FIG. 1, with the reference numerals increased by 700. In control cluster 811, the icon areas 813a-813e are arranged in an array around trigger icon area 815. The gaming management platform 103 (FIG. 1) has caused an additional icon area 813f to be included in the user interface 109 (FIG. 1). The additional icon area 813f is one or more of a start of a second array of icon areas 813 that are optionally added around the array of icon areas 813a-813e during the course of the video game. In some embodiments, the additional icon area 813f is included in the user interface 109 based on a user selection to include more than five icon areas in the control cluster 811.

Figure 9:
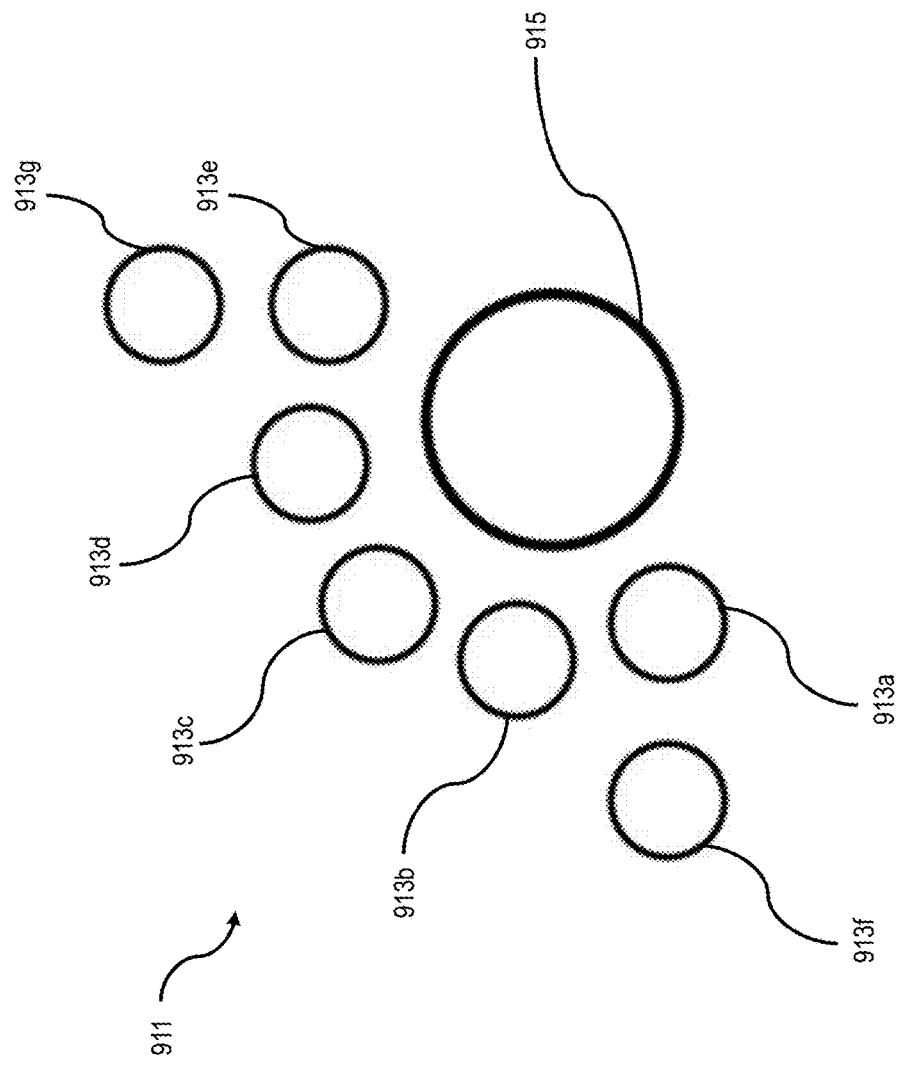
FIG. 9 is a diagram of a control cluster, in accordance with one or more embodiments.

FIG. 9 is a diagram of a control cluster 911, in accordance with one or more embodiments. Control cluster 911 is similar to control cluster 111 discussed with respect to FIG. 1, with the reference numerals increased by 800. In control cluster 911, the icon areas 913a-913e are arranged in an array around trigger icon area 915. The gaming management platform 103 (FIG. 1) has caused two additional icon areas 913f and 913g to be included in the user interface 109 (FIG. 1). The additional icon areas 913f and 913g are optionally added around the array of icon areas 913a-913e during the course of the video game. In some embodiments, the additional icon areas 913f and 913g included in the user interface 109 based on a user selection to include more than five icon areas in the control cluster 911.

Figure 10:
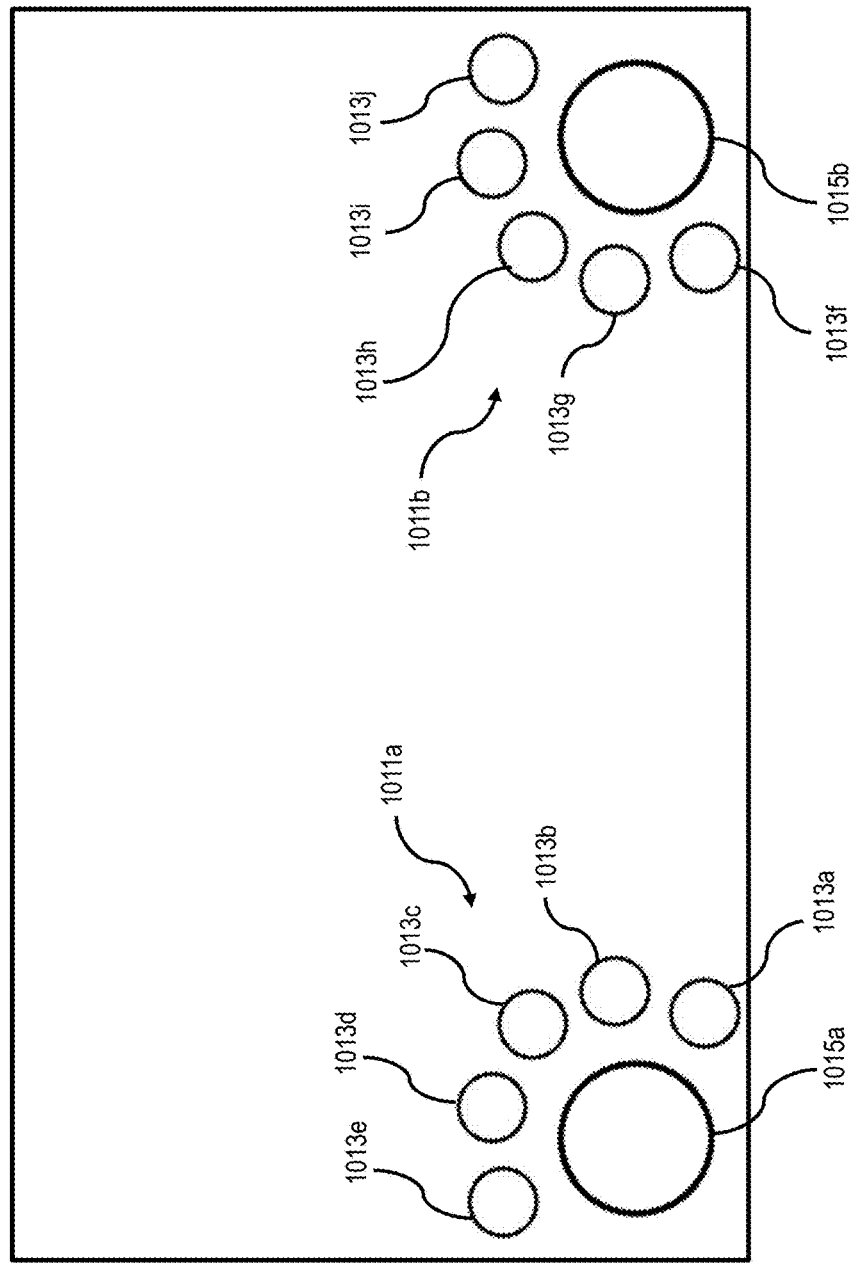
FIG. 10 is a diagram of a control cluster, in accordance with one or more embodiments.

FIG. 10 is a diagram of two control clusters 1011a and 1011b, in accordance with one or more embodiments. Control clusters 1011a and 1011b are similar to control cluster 111 discussed with respect to FIG. 1, with the reference numerals increased by 900. Control cluster 1011a is in a left-hand lower corner of the user interface 109 (FIG. 1) and control cluster 1011b is in a right-hand lower corner of user interface 109. The gaming management platform 103 has caused more than one game play feature to be available for charging—one to be capable of being executed by way of control cluster 1011a and one to be capable of being executed by way of control cluster 1011b. Control clusters 1011a and 1011b each comprise an equal quantity of icon areas 1013 and trigger icon areas 1015.

Figure 11:
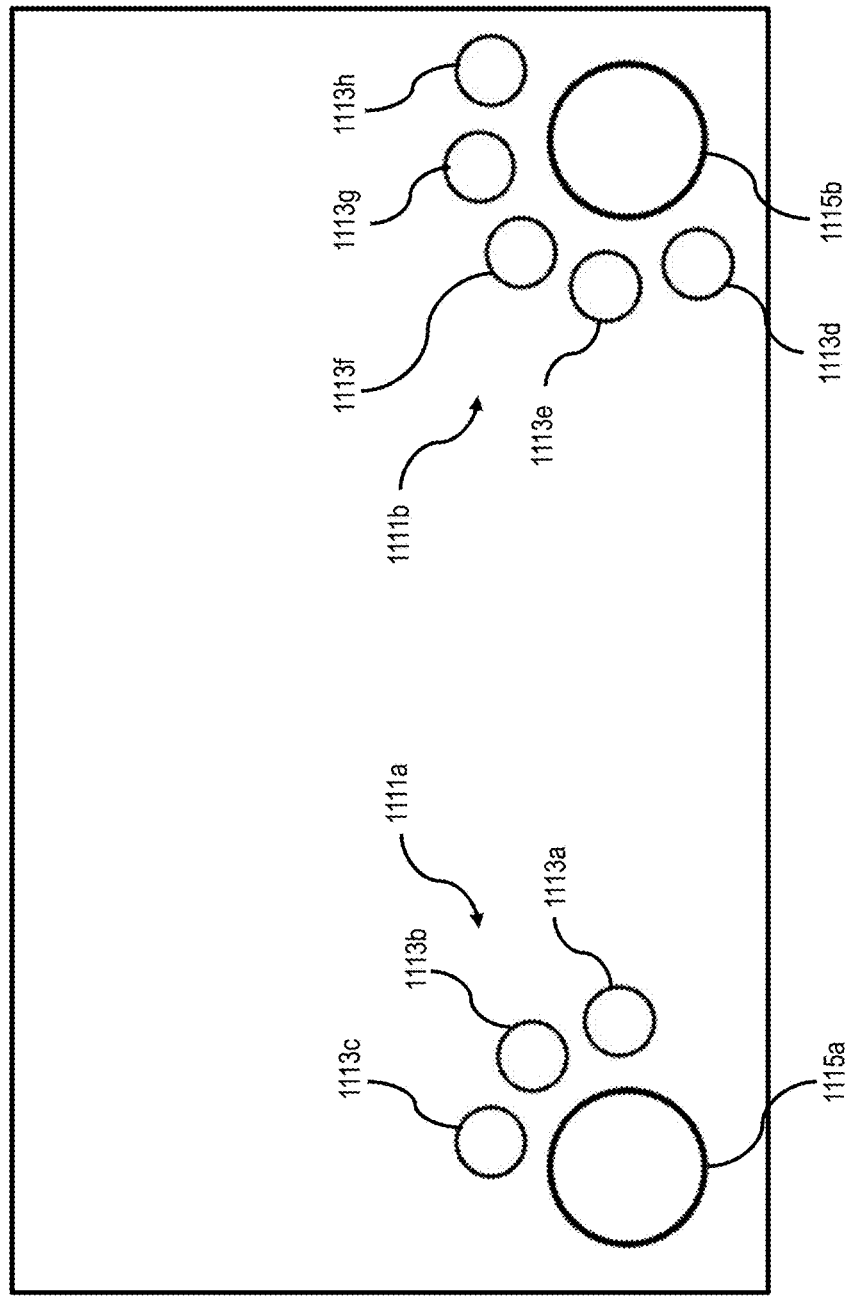
FIG. 11 is a diagram of a control cluster, in accordance with one or more embodiments.

FIG. 11 is a diagram of two control clusters 1111a and 1111b, in accordance with one or more embodiments. Control clusters 1111a and 1111b are similar to control cluster 111 discussed with respect to FIG. 1, with the reference numerals increased by 1000. Control cluster 1111a is in a left-hand lower corner of the user interface 109 (FIG. 1) and control cluster 1111b is in a right-hand lower corner of user interface 109. The gaming management platform 103 has caused more than one game play feature to be available for charging—one to be capable of being executed by way of control cluster 1111a and one to be capable of being executed by way of control cluster 1111b. Control clusters 1111a and 1111b comprise a different quantity of icon areas 1013 and an equal quantity of trigger icon areas 1115.

Figure 12:
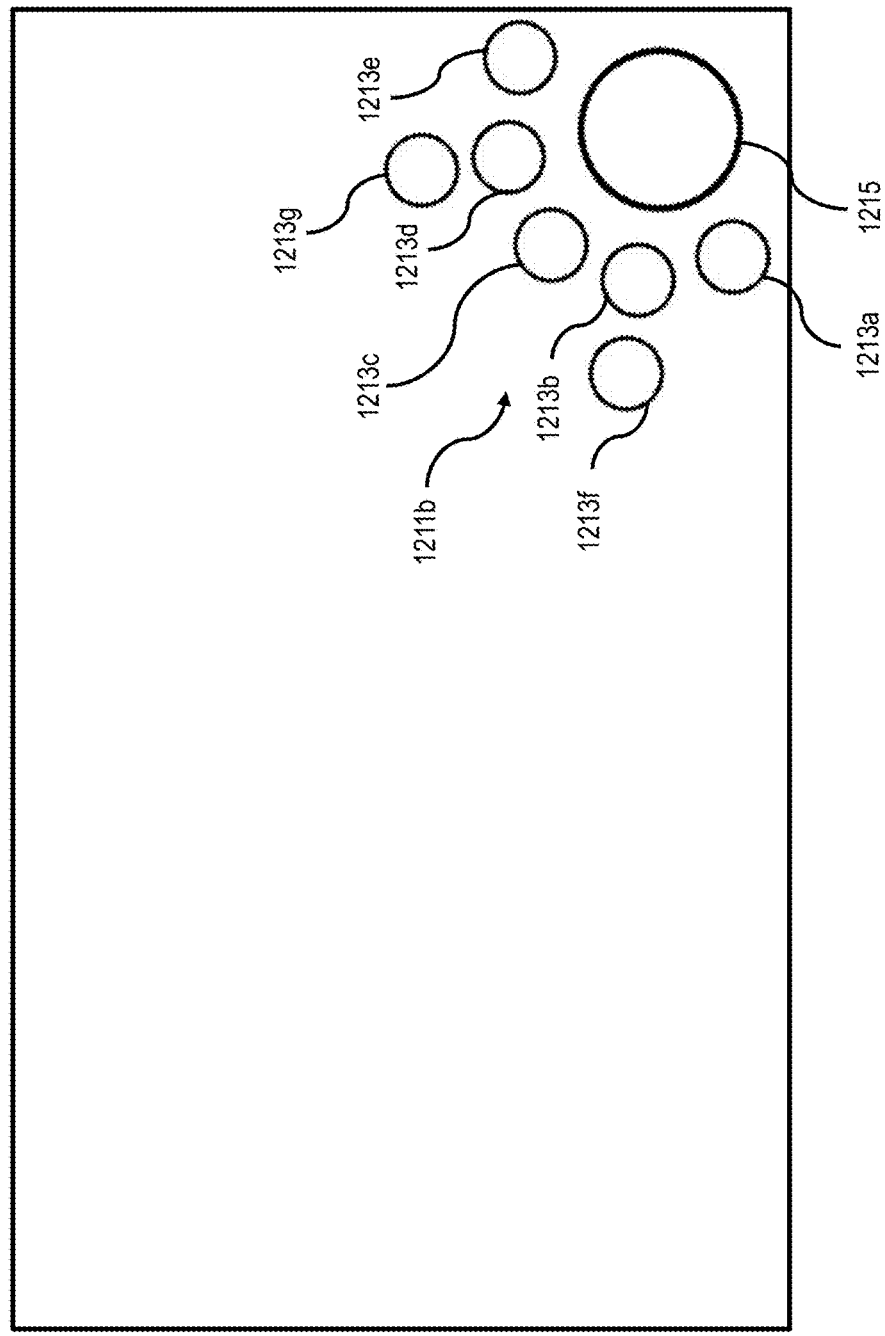
FIG. 12 is a diagram of a control cluster, in accordance with one or more embodiments.

FIG. 12 is a diagram of a control cluster 1211, in accordance with one or more embodiments. Control cluster 1211 is similar to control cluster 111 discussed with respect to FIG. 1, with the reference numerals increased by 1100. In control cluster 1211, the icon areas 1213a-1213e are arranged in an array around trigger icon area 1215. The gaming management platform 103 (FIG. 1) has caused two additional icon areas 1213f and 1213g to be included in the user interface 109 (FIG. 1). The additional icon areas 1213f and 1213g are optionally added around the array of icon areas 1213a-1213e during the course of the video game. In some embodiments, the additional icon areas 1213f and 1213g included in the user interface 109 based on a user selection to include more than five icon areas in the control cluster 1211. In some embodiments, a position of the additional icon areas 1213f and 1213g is based on a user selection to place the additional icon areas 1213f and 1213g in an alignment with a particular one of icon areas 1213a-1213e. In FIG. 12, additional icon area 1213f is aligned with icon area 1213b and additional icon area 1213g is aligned with icon area 1213d. In some embodiments, the alignment of the additional icon areas 1213f and 1213g is based on an association of the image to be included in additional icon area 1213f or the image to be included in icon area 1213g with icon area 1213b or icon area 1213d.

Figure 13:
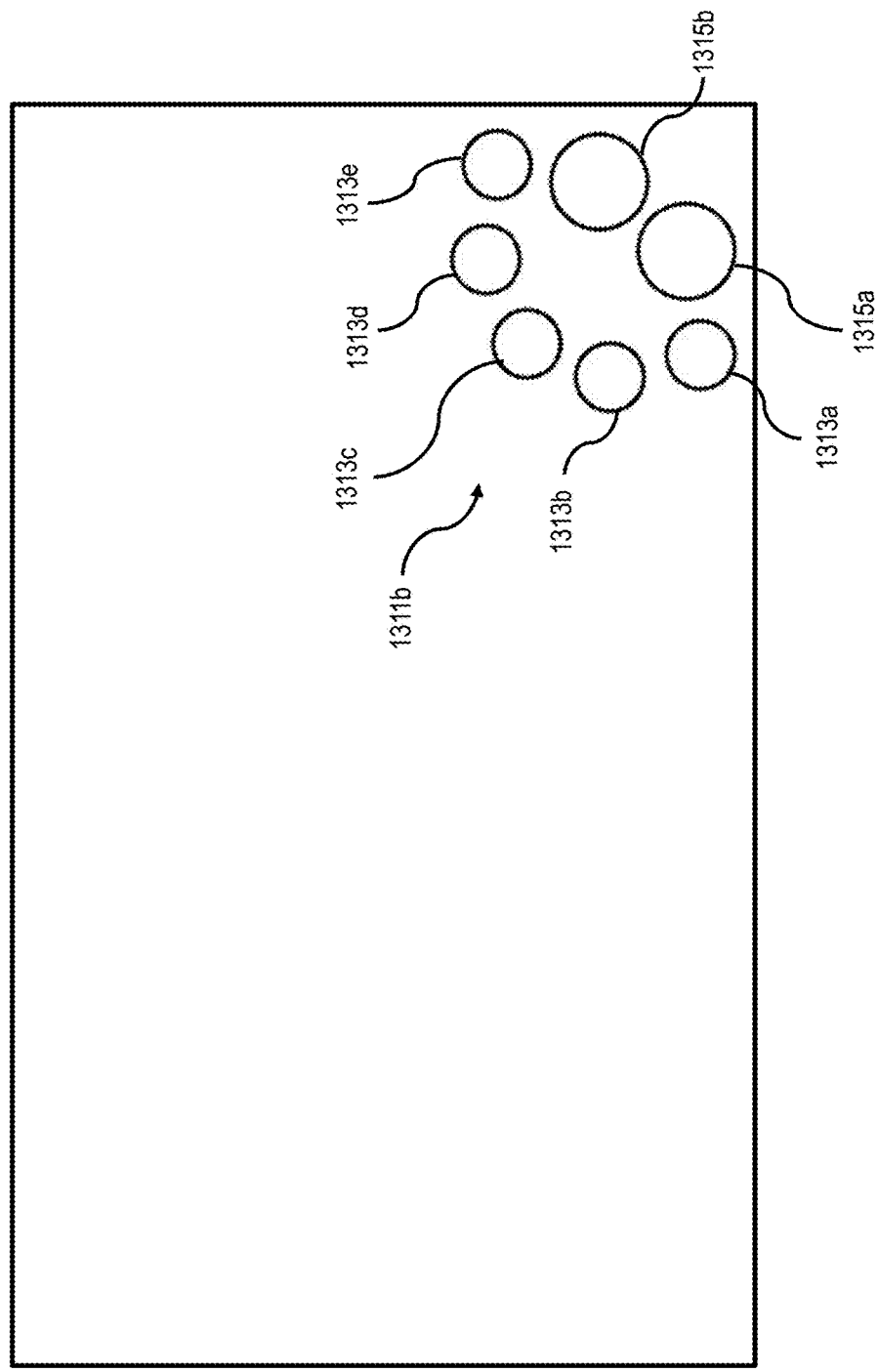
FIG. 13 is a diagram of a control cluster, in accordance with one or more embodiments.

FIG. 13 is a diagram of a control cluster 1311, in accordance with one or more embodiments. Control cluster 1311 is similar to control cluster 111 discussed with respect to FIG. 1, with the reference numerals increased by 1200. In control cluster 1311, the icon areas 1313a-1313e are arranged in an array around two trigger icon areas 1315a and 1315b. The gaming management platform 103 (FIG. 1) has caused two trigger icon areas 1315a and 1315 to be included in the user interface 109 (FIG. 1). The inclusion of two trigger icon areas 1315a and 1315b indicates that more than one game play feature is capable of being made ready for execution during a charging process. In some embodiments, one or more graphical links are caused to indicate an association between the trigger icon areas 1315a and 1315b and one or more of the icon areas 1313a-1313e to indicate that an action associated with a linked icon area 1313a-1313e will cause the linked trigger icon area to charge the game play feature indicated by a trigger icon included therein.

Figure 14:
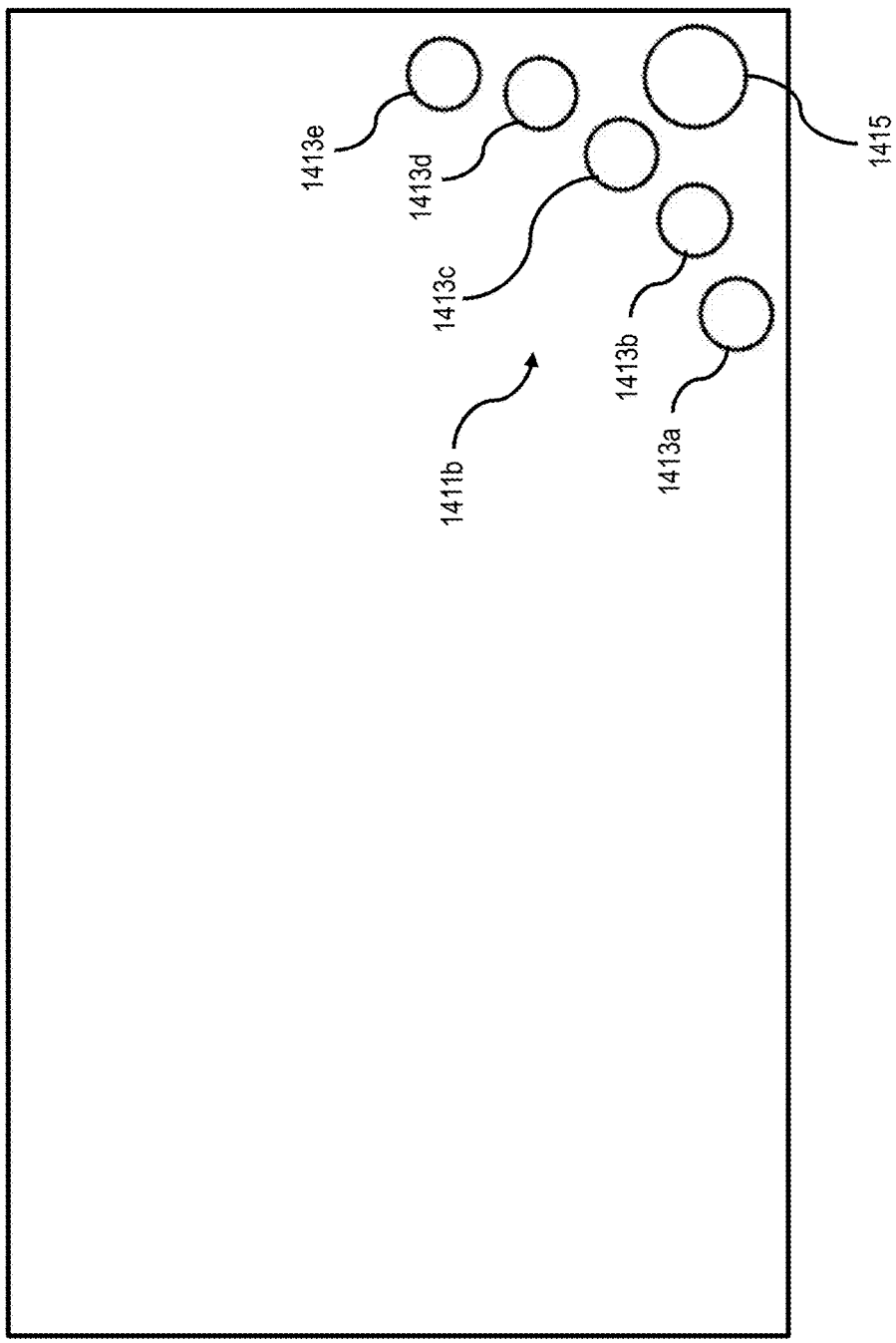
FIG. 14 is a diagram of a control cluster, in accordance with one or more embodiments.

FIG. 14 is a diagram of a control cluster 1411, in accordance with one or more embodiments. Control cluster 1411 is similar to control cluster 111 discussed with respect to FIG. 1, with the reference numerals increased by 1300. In control cluster 1411, the icon areas 1413a-1413e are arranged in an inverted array around trigger icon area 1415. In some embodiments, the inverted array of icon areas 1413a-1413e is based on a user preference. In some embodiments, the inverted array of icon areas 1413a-1413e is caused by the gaming management platform 103 (FIG. 1) based on the context of the interactive virtual environment.

Figure 15:
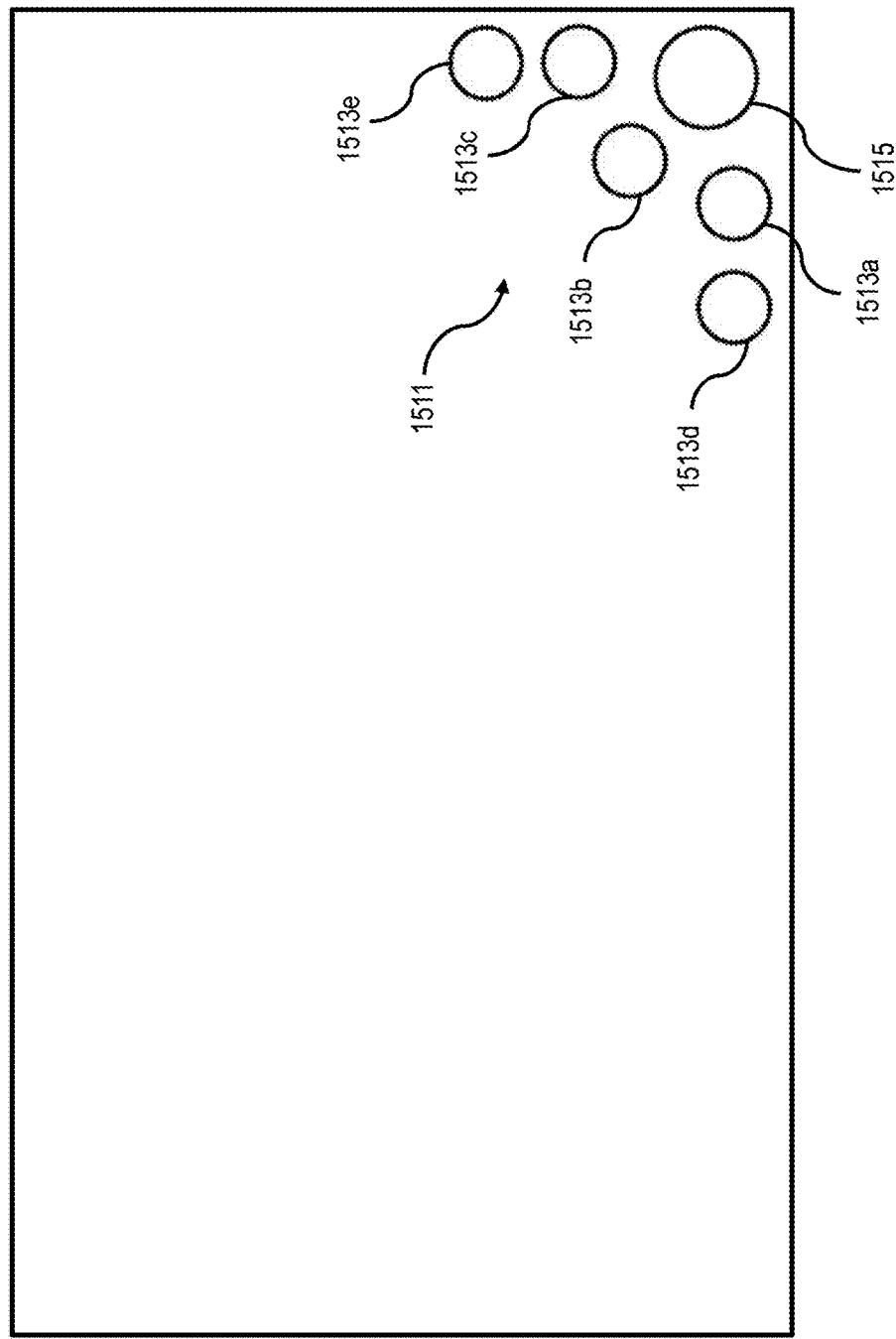
FIG. 15 is a diagram of a control cluster, in accordance with one or more embodiments.

FIG. 15 is a diagram of a control cluster 1511, in accordance with one or more embodiments. Control cluster 1511 is similar to control cluster 111 discussed with respect to FIG. 1, with the reference numerals increased by 1400. In control cluster 1511, the icon areas 1513a-1513c are arranged in a first array around trigger icon area 1515, and icon areas 1513d-1513e are arranged at the beginning and end of a second array around trigger icon area 1515, outside the first array. In some embodiments, the additional array of icon areas is based on a user preference. In some embodiments, the additional array of icon areas is caused by the gaming management platform 103 (FIG. 1) based on the context of the interactive virtual environment.

Figure 16:
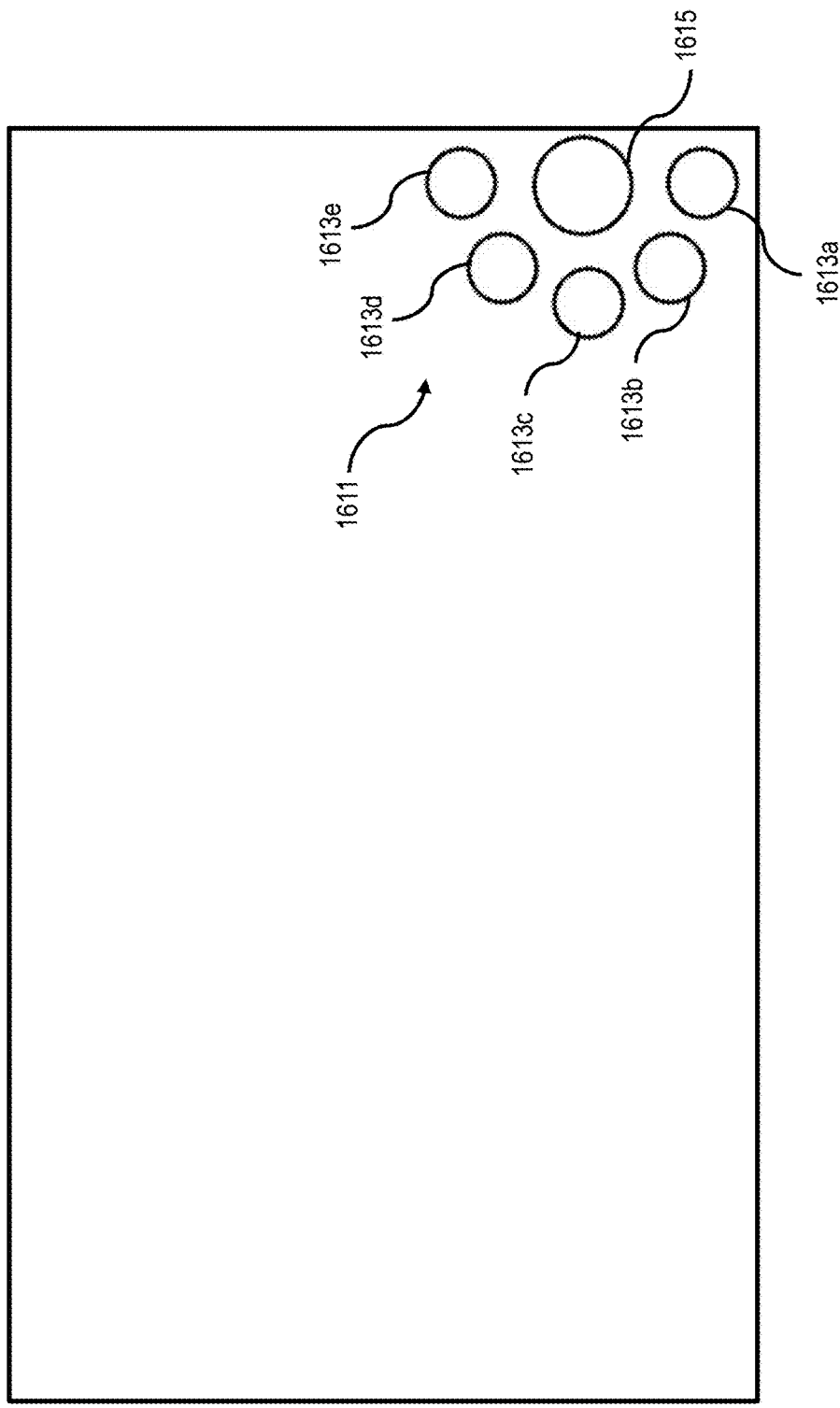
FIG. 16 is a diagram of a control cluster, in accordance with one or more embodiments.

FIG. 16 is a diagram of a control cluster 1611, in accordance with one or more embodiments. Control cluster 1611 is similar to control cluster 111 discussed with respect to FIG. 1, with the reference numerals increased by 1500. In control cluster 1611, the icon areas 1613a-1613e are arranged in an array around trigger icon area 1615, with the trigger icon area 1615 having icon areas 1613a and 1613b above and below the trigger icon area 1615. In some embodiments, the arrangement of icon areas 1613a-1613e around trigger icon area 1615 is based on a user preference. In some embodiments, the arrangement of icon areas 1613a-1613e around trigger icon area 1615 is caused by the gaming management platform 103 (FIG. 1) based on the context of the interactive virtual environment.

Figure 17:
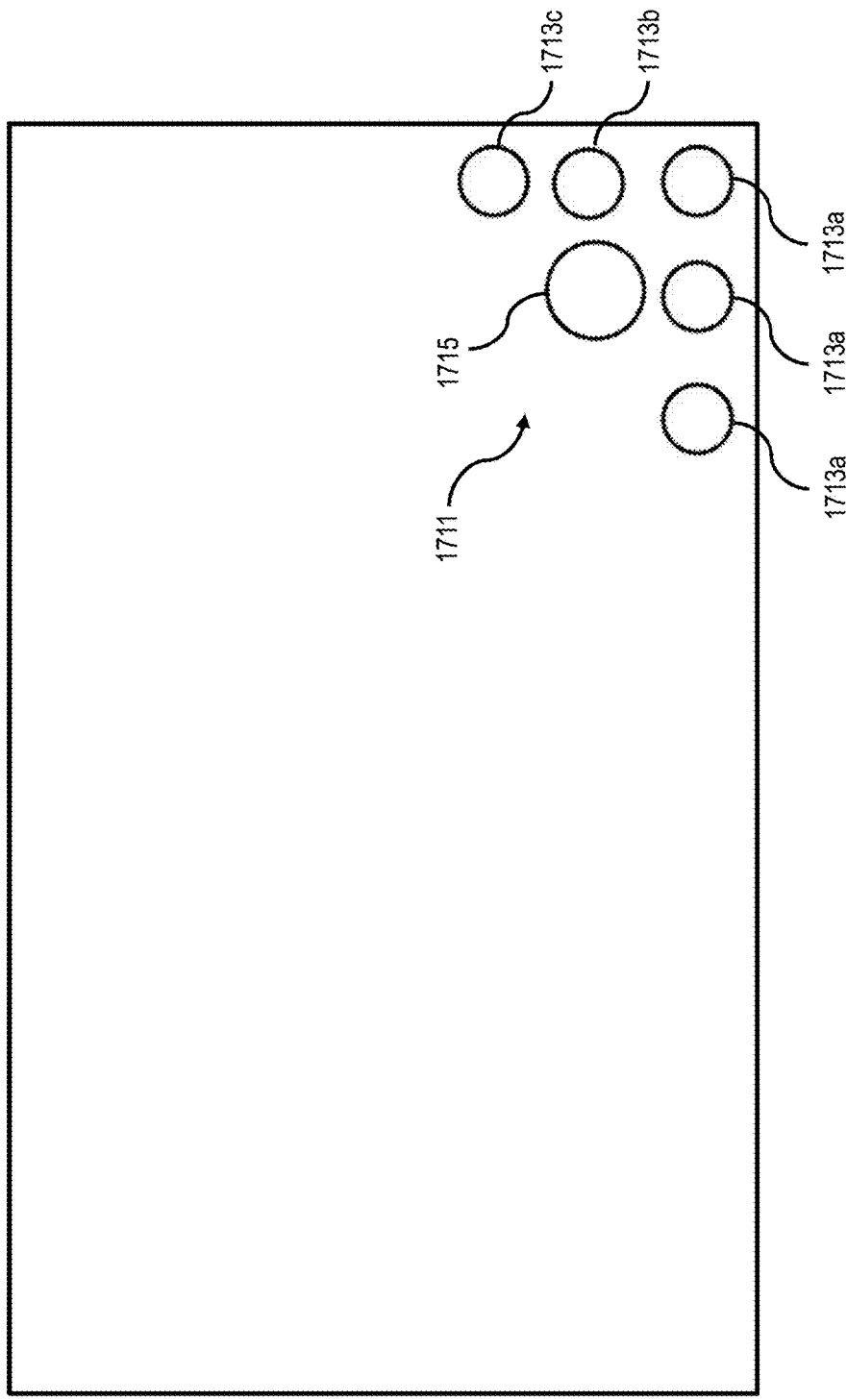
FIG. 17 is a diagram of a control cluster, in accordance with one or more embodiments.

FIG. 17 is a diagram of a control cluster 1711, in accordance with one or more embodiments. Control cluster 1711 is similar to control cluster 111 discussed with respect to FIG. 1, with the reference numerals increased by 1600. In control cluster 1711, the icon areas 1713a-1713e are arranged in an array around trigger icon area 1715, with the trigger icon area 1715 being closer to a center of the user interface 109 (FIG. 1) than the icon areas 1713a-1713e. In some embodiments, the arrangement of icon areas 1713a-1713e with respect to trigger icon area 1715 is based on a user preference. In some embodiments, the arrangement of icon areas 1713a-1713e with respect to trigger icon area 1715 is caused by the gaming management platform 103 (FIG. 1) based on the context of the interactive virtual environment.

Figure 18:
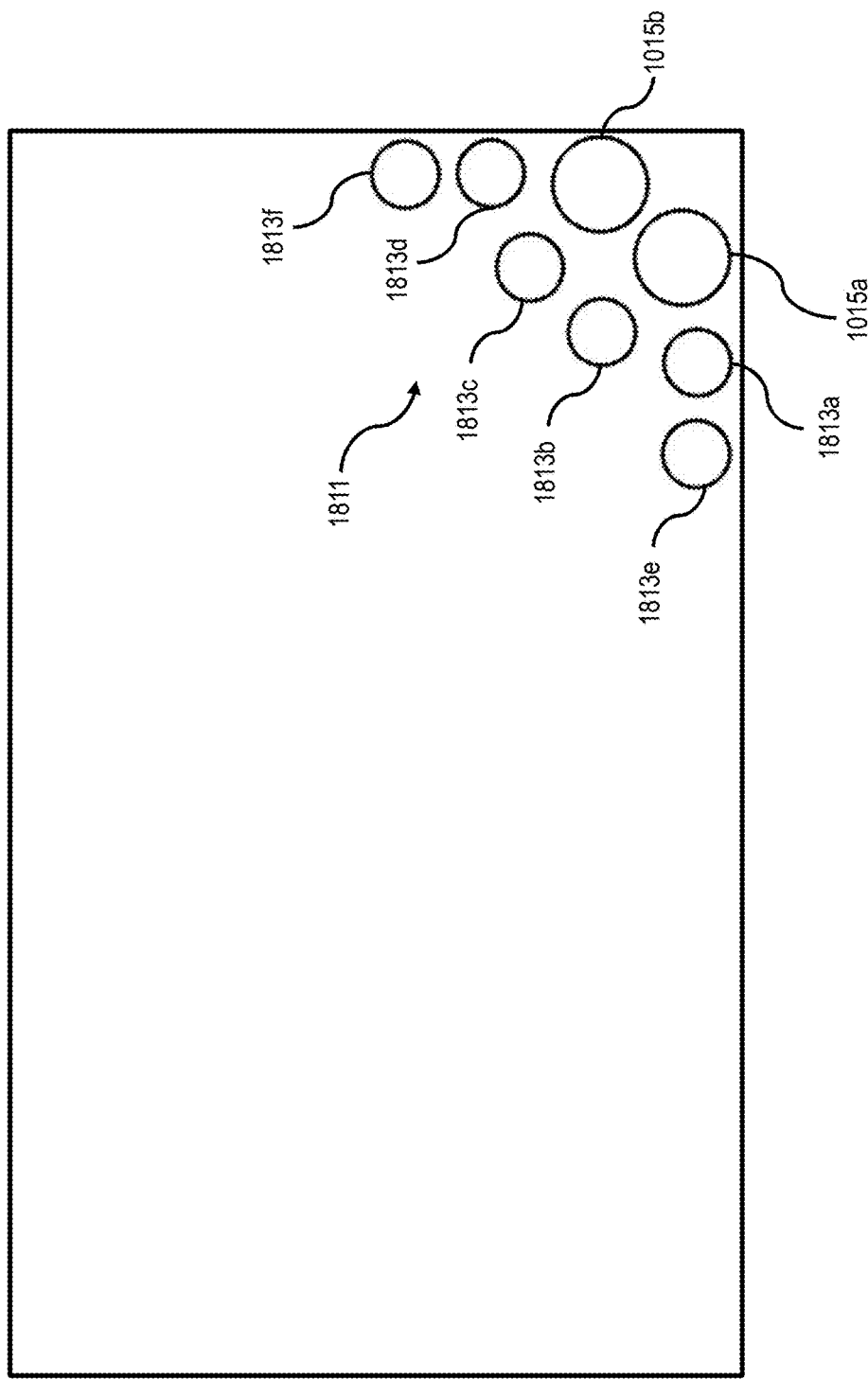
FIG. 18 is a diagram of a control cluster, in accordance with one or more embodiments.

FIG. 18 is a diagram of a control cluster, in accordance with one or more embodiments. Control cluster 1811 is similar to control cluster 111 discussed with respect to FIG. 1, with the reference numerals increased by 1700. In control cluster 1811, the icon areas 1813a-1813d are arranged in a first array around trigger icon areas 1815a and 1815b. The gaming management platform 103 (FIG. 1) has caused two additional icon areas 1813e and 1813f to be included in the user interface 109 (FIG. 1). The additional icon areas 1813e and 1813f are optionally added around the array of icon areas 1813a-1813d during the course of the video game. In some embodiments, the additional icon areas 1813e and 1813f are included in the user interface 109 based on a user selection to include more than five icon areas in the control cluster 1811. In some embodiments, a position of the additional icon areas 1813e and 1813f is based on a user selection to place the additional icon areas 1813e and 1813f in an alignment with a particular one of icon areas 1813a-1813d. In FIG. 18, additional icon area 1813e is aligned with icon area 1813a and additional icon area 1813f is aligned with icon area 1813d. In some embodiments, the alignment of the additional icon areas 1813e and 1813f is based on an association of the image to be included in additional icon area 1813e or the image to be included in icon area 1813f with icon area 1813a or icon area 1813d.

The inclusion of two trigger icon areas 1815a and 1815b indicates that more than one game play feature is capable of being made ready for execution during a charging process. In some embodiments, one or more graphical links are caused to indicate an association between the trigger icon areas 1815a and 1815b and one or more of the icon areas 1813a-1813f to indicate that an action associated with a linked icon area 1813a-1813f will cause the linked trigger icon area to charge the game play feature indicated by a trigger icon included therein.

Figure 19:
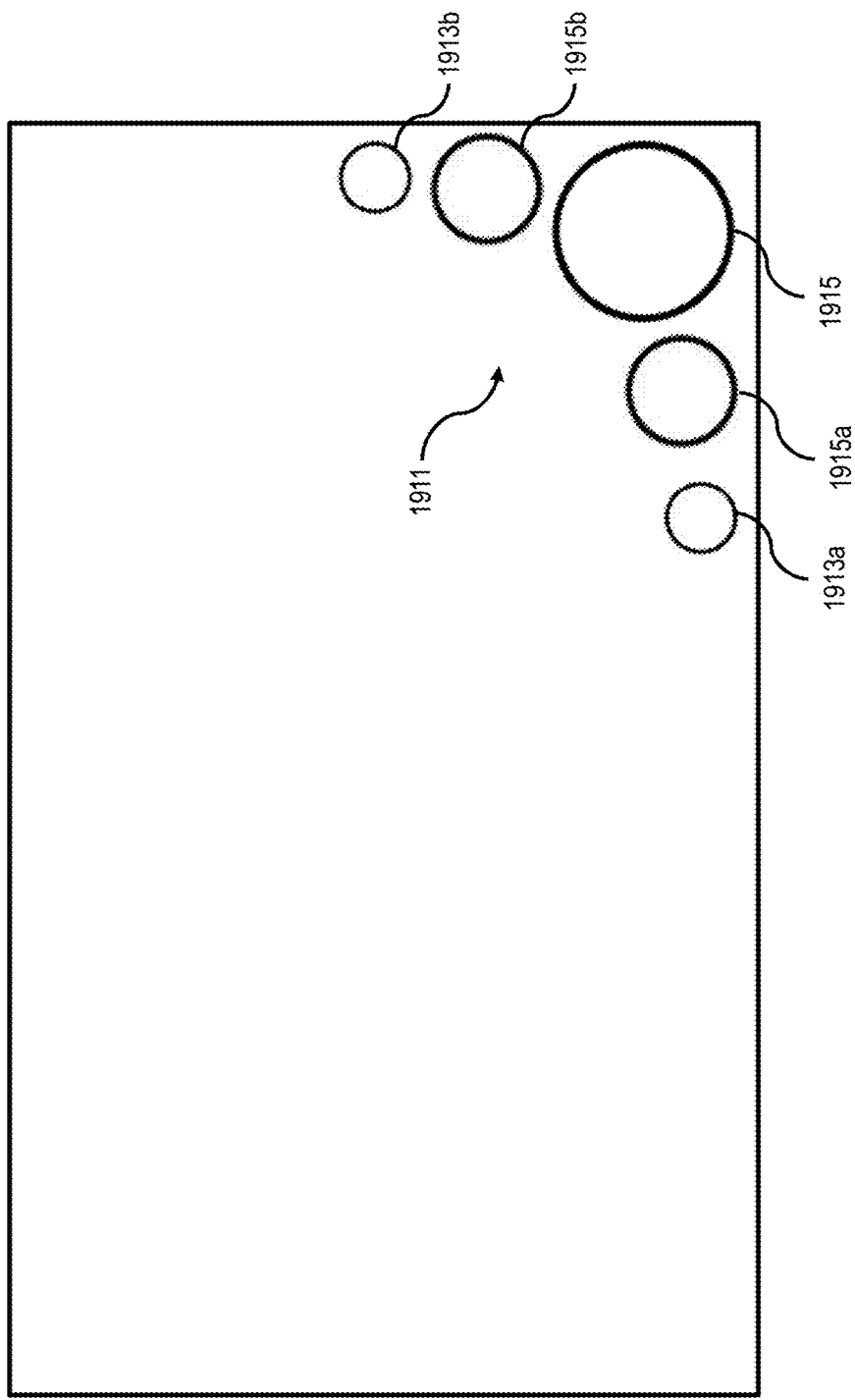
FIG. 19 is a diagram of a control cluster, in accordance with one or more embodiments.

FIG. 19 is a diagram of a control cluster 1911, in accordance with one or more embodiments. Control cluster 1911 is similar to control cluster 111 discussed with respect to FIG. 1, with the reference numerals increased by 1800. Control cluster 1911 includes trigger icon area 1915 and sub-trigger icon areas 1915a and 1915b. Icon areas 1913a and 1913e are arranged such that sub-trigger icon area 1915a is between icon area 1913a and trigger icon area 1915, and sub-trigger icon area 1915b is between icon area 1913b and trigger icon area 1915. Sub-trigger icon areas 1915a and 1915b have surface areas that are smaller than the trigger icon area 1915. In some embodiments, the gaming management platform 103 (FIG. 1) is configured to cause the image included in one or more of trigger icon area 915 or sub-trigger icon areas 1915a and 1915b to rotate, so that the trigger icon 1927 included in the trigger icon area 1915 is indicative of an active game play feature capable of being executed based on a user input, and a trigger image included in the sub-trigger icon areas 1915a and 1915b is parked, such that the game play feature indicated by the trigger image included in sub-trigger icon areas 1915a and 1915b are inactive, until moved to the trigger icon area 1915. In some embodiments, the inclusion of trigger icon area 1915 and sub-trigger icon areas 1915a and 1915b indicates that more than one game play feature is available for execution or charging. In some embodiments, the inclusion of trigger icon area 1915 and sub-trigger icon areas 1915a and 1915b is based on a user preference. In some embodiments, the inclusion of trigger icon area 1915 and sub-trigger icon areas 1915a and 1915b is caused by the gaming management platform 103 based on the context of the interactive virtual environment.

FIG. 20 is a flowchart of a method 2000, in accordance with one or more embodiments. In some embodiments, method 2000 is performed by a processor executing gaming management platform 103 (FIG. 1).

In step 2001, a user interface comprising an interactive virtual environment is caused to be output by a display.

In step 2003, a control cluster is caused to be included in the user interface and overlapping with the interactive virtual environment. In some embodiment, the control cluster comprises a plurality of icon areas. In some embodiments, the control cluster comprises an array of icon areas positioned in an arced pattern around a trigger icon area.

In step 2005, a first image is caused to be displayed in a first icon area of the plurality of icon areas and a second image in a second icon area of the plurality of icon areas.

In step 2007, a copy of the first image is caused to be displayed in the trigger icon area or a copy of the second image is caused to be displayed in the trigger icon area.

In step 2009, an indicator is optionally caused to be displayed surrounding the trigger icon area. The optional indicator is configured to indicate a readiness level of a game play feature to be executed based on a user input.

In optional step 2011, a graphical link is caused to be displayed indicating a correspondence between the first image displayed in the first icon area and the copy of the first image displayed in the trigger icon area, or the second image displayed in the second icon area and the copy of the second image displayed in the trigger icon area.

In step 2013, the readiness level is caused to change based on one or more of a first type of occurrence in the interactive virtual environment associated with the first image or a second type of occurrence in the interactive virtual environment associated with the second image. In some embodiments, the readiness level is caused to change based on one or more of a passage of time within the interactive virtual environment, a real-world passage of time, or a real-world event. In some embodiments, a quantity of user interactions with the interactive virtual environment during the passage of time within the interactive virtual environment is detected, and an amount of time a user is interacting with the interactive virtual environment based on the quantity of user interactions during the passage of time within the interactive virtual environment is calculated. The readiness level is then caused to change based on a percentage of time the user is interacting with the interactive virtual environment during the passage of time within the interactive virtual environment.

In some embodiments, the readiness level is caused to change by a first amount based on the first type of occurrence in the interactive virtual environment or by a second amount based on the second type of occurrence in the interactive virtual different from the first amount. In some embodiments, the readiness level is changed by the first amount based on the first type of occurrence in the interactive virtual environment if the copy of the first image is displayed in the trigger icon area, and the readiness level is changed by the second amount based on the second type of occurrence in the interactive virtual environment if the copy of the second image is displayed in the trigger icon area. In some embodiments, the readiness level is changed by a third amount different from the first amount based on the first type of occurrence in the interactive virtual environment if the copy of the second icon is displayed in the trigger icon area at a time the first type of occurrence in the interactive virtual environment occurs, and the readiness level is changed by a fourth amount different from the second amount based on the second type of occurrence in the interactive virtual environment if the copy of the first icon is displayed in the trigger icon area at a time the second type of occurrence in the interactive virtual environment occurs. In some embodiments, the readiness level is changed based on one or more of the first type of occurrence or the second type of occurrence occurs, and to decrease the readiness level based on an event in the virtual environment.

In optional step 2015, a numerical value is caused to be included in the user interface if the copy of the first image is displayed in the trigger icon area or if the copy of the second image is displayed in the trigger icon area. The numerical value indicates the first amount the readiness level is caused to change if the first image is displayed in the trigger icon area, and the numerical value indicates the second amount the readiness level is caused to change if the second image is displayed in the trigger icon area. In some embodiments, the numerical value is caused to be concurrently displayed with copy of the first image or the copy of the second image. In some embodiments, the numerical value indicates the readiness level of the game play feature.

In optional step 2017, the copy of the first image displayed in the trigger icon area is caused to be replaced with a copy of the second image during a charge mode for increasing the readiness of the game play feature based on a first predetermined period of time, and the copy of the second image displayed in the trigger icon area is caused to be replaced with the copy of the first image during the charge mode for increasing the readiness of the game play feature based on a predetermined period of time.

In step 2019, the copy of the first image displayed in the trigger icon area or the copy of the second image displayed in the trigger icon area is caused to be replaced with a trigger image indicating the game play feature is ready to be executed based on the readiness level.

In step 2021, the game play feature is caused to be executed based on a user interaction with the trigger image displayed in the trigger icon area.

Figure 21:
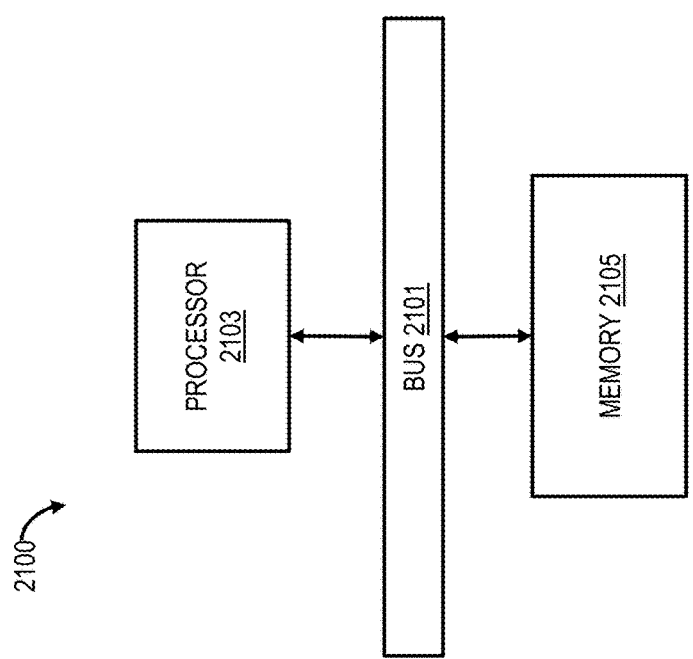
FIG. 21 is a functional block diagram of a computer or processor-based system upon which or by which some embodiments are implemented.

FIG. 21 is a functional block diagram of a computer or processor-based system 2100 upon which or by which an embodiment is implemented.

Processor-based system 2100 is programmed to enhance a gaming experience by causing a control cluster to be included in a user interface, as described herein, and includes, for example, bus 2101, processor 2103, and memory 2105 components.

In some embodiments, the processor-based system is implemented as a single "system on a chip." Processor-based system 2100, or a portion thereof, constitutes a mechanism for performing one or more steps of enhance a gaming experience by causing a control cluster to be included in a user interface.

In some embodiments, the processor-based system 2100 includes a communication mechanism such as bus 2101 for transferring information and/or instructions among the components of the processor-based system 2100. Processor 2103 is connected to the bus 2101 to obtain instructions for execution and process information stored in, for example, the memory 2105. In some embodiments, the processor 2103 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor 2103. Similarly, an ASIC is configurable to perform specialized functions not easily performed by a more general purpose processor. Other specialized components to aid in performing the functions described herein optionally include one or more field programmable gate arrays (FPGA), one or more controllers, or one or more other special-purpose computer chips.

In one or more embodiments, the processor (or multiple processors) 2103 performs a set of operations on information as specified by a set of instructions stored in memory 2105 related to enhancing a gaming experience by causing a control cluster to be included in a user interface. The execution of the instructions causes the processor to perform specified functions.

The processor 2103 and accompanying components are connected to the memory 2105 via the bus 2101. The memory 2105 includes one or more of dynamic memory (e.g., RAM, magnetic disk, writable optical disk, etc.) and static memory (e.g., ROM, CD-ROM, etc.) for storing executable instructions that when executed perform the steps described herein to enhance a gaming experience by causing a control cluster to be included in a user interface. The memory 2105 also stores the data associated with or generated by the execution of the steps.

In one or more embodiments, the memory 2105, such as a random access memory (RAM) or any other dynamic storage device, stores information including processor instructions for enhancing a gaming experience by causing a control cluster to be included in a user interface. Dynamic memory allows information stored therein to be changed by system 100. RAM allows a unit of information stored at a location called a memory address to be stored and retrieved independently of information at neighboring addresses. The memory 2105 is also used by the processor 2103 to store temporary values during execution of processor instructions. In various embodiments, the memory 2105 is a read only memory (ROM) or any other static storage device coupled to the bus 2101 for storing static information, including instructions, that is not changed by the system 100. Some memory is composed of volatile storage that loses the information stored thereon when power is lost. In some embodiments, the memory 2105 is a non-volatile (persistent) storage device, such as a magnetic disk, optical disk or flash card, for storing information, including instructions, that persists even when the system 100 is turned off or otherwise loses power.

The term "computer-readable medium" as used herein refers to any medium that participates in providing information to processor 2103, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

An aspect of this description is related to a method that comprises causing, by a processor, a user interface comprising an interactive virtual environment to be output by a display. The method also comprises causing a control cluster to be included in the user interface and overlapping with the interactive virtual environment. The control cluster comprises a first icon area, a second icon area, and a trigger icon area. The method further comprises causing a first image to be displayed in the first icon area and a second image to be displayed in the second icon area. The method additionally comprises causing a copy of the first image to be displayed in the trigger icon area or a copy of the second image to be displayed in the trigger icon area. The method also comprises causing a readiness level of a game play feature to be executed based on a user input to change based on one or more of a first type of occurrence in the interactive virtual environment associated with the first image or a second type of occurrence in the interactive virtual environment associated with the second image. The method further comprises causing the readiness level to change by a first amount based on the first type of occurrence in the interactive virtual environment or by a second amount based on the second type of occurrence in the interactive virtual different from the first amount. The method additionally comprises causing the copy of the first image displayed in the trigger icon area or the copy of the second image displayed in the trigger icon area to be replaced with a trigger image indicating the game play feature is ready to be executed based on the readiness level.

Another aspect of this description is related to an apparatus comprising a processor and a memory having computer executable instruction stored thereon that, when executed by the processor, cause the apparatus to cause a user interface comprising an interactive virtual environment to be output by a display. The apparatus is also caused to cause a control cluster to be included in the user interface and overlapping with the interactive virtual environment. The control cluster comprises an array of icon areas positioned in an arced pattern around a trigger icon area. The apparatus is further caused to cause a first image to be displayed in a first icon area of the array of icon areas and a second image to be displayed in a second icon area of the array of icon areas. The apparatus is additionally caused to cause a copy of the first image to be displayed in the trigger icon area or a copy of the second image to be displayed in the trigger icon area. The apparatus is also caused to cause a readiness level of a game play feature to be executed based on a user input to change based on one or more of a first type of occurrence in the interactive virtual environment associated with the first image or a second type of occurrence in the interactive virtual environment associated with the second image. The apparatus is additionally caused to cause the readiness level to change by a first amount based on the first type of occurrence in the interactive virtual environment or by a second amount based on the second type of occurrence in the interactive virtual different from the first amount. The apparatus is also caused to cause the copy of the first image displayed in the trigger icon area or the copy of the second image displayed in the trigger icon area to be replaced with a trigger image indicating the game play feature is ready to be executed based on the readiness level.

A further aspect of this description is related to a method comprising displaying a control cluster in a user interface. The control cluster comprises a first icon area, a second icon area, and a trigger icon area. The method further comprises building up a readiness level of a game play feature to be executed based on a user interaction with a touchscreen display until the game play feature is ready to be executed. The building up of the readiness level occurs while one or more of a first image displayed in the first icon area is concurrently displayed in the trigger icon area, or a graphical link between the first icon area and the trigger icon area is displayed. The method also comprises causing, by a processor, a trigger image to be displayed in the trigger icon area indicating the game play feature is ready to be executed based on the readiness level reaching a predetermined threshold value.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   causing, by a processor, a user interface comprising an interactive virtual environment to be output by a display;
   causing a control cluster to be included in the user interface and overlapping with the interactive virtual environment, the control cluster comprising a first icon area, a second icon area, and a trigger icon area;
   causing a first image to be displayed in the first icon area and a second image to be displayed in the second icon area;
   causing a copy of the first image to be displayed in the trigger icon area or a copy of the second image to be displayed in the trigger icon area;
   causing a readiness level of a game play feature to be executed based on a user input to change based on one or more of a first type of occurrence in the interactive virtual environment associated with the first image or a second type of occurrence in the interactive virtual environment associated with the second image;
   causing the readiness level to change by a first amount based on the first type of occurrence in the interactive virtual environment or by a second amount based on the second type of occurrence in the interactive virtual different from the first amount; and
   causing the copy of the first image displayed in the trigger icon area or the copy of the second image displayed in the trigger icon area to be replaced with a trigger image indicating the game play feature is ready to be executed based on the readiness level.

2. The method of claim 1, further comprising:
   causing the game play feature to be executed based on a user interaction with the trigger image displayed in the trigger icon area.

3. The method of claim 1, further comprising:
   causing the readiness level to change based on one or more of a passage of time within the interactive virtual environment, a real-world passage of time, or a real-world event.

4. The method of claim 3, further comprising:
   detecting a quantity of user interactions with the interactive virtual environment during the passage of time within the interactive virtual environment;
   calculating an amount of time a user is interacting with the interactive virtual environment based on the quantity of user interactions during the passage of time within the interactive virtual environment; and
   causing the readiness level to change based on a percentage of time the user is interacting with the interactive virtual environment during the passage of time within the interactive virtual environment.

5. The method of claim 1, wherein the further comprising:
   causing a numerical value to be included in the user interface if the copy of the first image is displayed in the trigger icon area or if the copy of the second image is displayed in the trigger icon area,
   wherein the numerical value indicates the first amount the readiness level is caused to change if the first image is displayed in the trigger icon area, and the numerical value indicates the second amount the readiness level is caused to change if the second image is displayed in the trigger icon area.

6. The method of claim 5, further comprising;
   causing the numerical value to be concurrently displayed with the copy of the first image or the copy of the second image.

7. The method of claim 1, further comprising:
   causing a graphical link to be displayed indicating a correspondence between the first image displayed in the first icon area and the copy of the first image displayed in the trigger icon area.

8. The method of claim 1, further comprising:
   causing the readiness level to change by the first amount based on the first type of occurrence in the interactive virtual environment if the copy of the first image is displayed in the trigger icon area; and causing the readiness level to change by the second amount based on the second type of occurrence in the interactive virtual environment if the copy of the second image is displayed in the trigger icon area.

9. The method of claim 1, further comprising:
causing the readiness level to change by a third amount different from the first amount based on the first type of occurrence in the interactive virtual environment if the copy of the second icon is displayed in the trigger icon area at a time the first type of occurrence in the interactive virtual environment occurs; and
causing the readiness level to change by a fourth amount different from the second amount based on the second type of occurrence in the interactive virtual environment if the copy of the first icon is displayed in the trigger icon area at a time the second type of occurrence in the interactive virtual environment occurs.

10. The method of claim 9, further comprising:
causing the copy of the first image displayed in the trigger icon area to be replaced with the copy of the second image during a charge mode for increasing the readiness level of the game play feature based on a first predetermined period of time; and
causing the copy of the second image displayed in the trigger icon area to be replaced with the copy of the first image during the charge mode for increasing the readiness level of the game play feature based on a second predetermined period of time.

11. The method of claim 1, wherein the readiness level is increased based on one or more of the first type of occurrence or the second type of occurrence occurs, and the readiness level is decreased based on an event in the virtual environment.

12. The method of claim 1, wherein the first icon area and the second icon area are among a plurality of icon areas, and at least three icon areas of the plurality of icon areas are arranged as an array of icon areas positioned in an arced pattern around the trigger icon area.

13. The method of claim 1, wherein the first icon area and the second icon area are among a plurality of icon areas, and at least one icon area of the plurality of icon areas is caused to be displayed having a surface area with respect to the display different from at least one other icon area of the plurality of icon areas.

14. The method of claim 1, further comprising:
causing a symbol configured to indicate the readiness level of the game play feature to be displayed surrounding the trigger icon area.

15. The method of claim 1, wherein the trigger icon area is one of at least two trigger icon areas included in the control cluster.

16. An apparatus, comprising:
a processor; and
a memory having computer executable instruction stored thereon that, when executed by the processor, cause the apparatus to:
cause a user interface comprising an interactive virtual environment to be output by a display;
cause a control cluster to be included in the user interface and overlapping with the interactive virtual environment, the control cluster comprising an array of icon areas positioned in an arced pattern around a trigger icon area;
cause a first image to be displayed in a first icon area of the array of icon areas and a second image in a second icon area of the array of icon areas;
cause a copy of the first image to be displayed in the trigger icon area or a copy of the second image to be displayed in the trigger icon area;
cause a readiness level of a game play feature to be executed based on a user input to change based on one or more of a first type of occurrence in the interactive virtual environment associated with the first image or a second type of occurrence in the interactive virtual environment associated with the second image;
cause the readiness level to change by a first amount based on the first type of occurrence in the interactive virtual environment or by a second amount based on the second type of occurrence in the interactive virtual different from the first amount; and
cause the copy of the first image displayed in the trigger icon area or the copy of the second image displayed in the trigger icon area to be replaced with a trigger image indicating the game play feature is ready to be executed.

17. The apparatus of claim 16, wherein the apparatus is further caused to:
cause the readiness level to change based on one or more of a passage of time within the interactive virtual environment, a real-world passage of time, or a real-world event.

18. The apparatus of claim 16, wherein the apparatus is further caused to:
cause a graphical link to be displayed indicating a correspondence between the first image displayed in the first icon area and the copy of the first image displayed in the trigger icon area.

19. The apparatus of claim 16, wherein the apparatus is further caused to:
cause the readiness level to change by the first amount based on the first type of occurrence in the interactive virtual environment if the copy of the first image is displayed in the trigger icon area; and
cause the readiness level by the second amount based on the second type of occurrence in the interactive virtual environment if the copy of the second image is displayed in the trigger icon area.

* * * * *